(12) United States Patent
McKenna

(10) Patent No.: US 9,376,051 B1
(45) Date of Patent: Jun. 28, 2016

(54) FIRST RESPONDERS' ROADWAY PRIORITY SYSTEM

(71) Applicant: Louis H. McKenna, Roseville, MN (US)

(72) Inventor: Louis H. McKenna, Roseville, MN (US)

( * ) Notice: Subject to any disclaimer, the term of this patent is extended or adjusted under 35 U.S.C. 154(b) by 0 days.

(21) Appl. No.: 14/158,816

(22) Filed: Jan. 18, 2014

Related U.S. Application Data

(60) Provisional application No. 61/754,566, filed on Jan. 19, 2013, provisional application No. 61/813,633, filed on Apr. 18, 2013.

(51) Int. Cl.
 *G08G 1/09* (2006.01)
 *B60Q 1/00* (2006.01)

(52) U.S. Cl.
 CPC ........................................ *B60Q 1/00* (2013.01)

(58) Field of Classification Search
 None
 See application file for complete search history.

(56) References Cited

U.S. PATENT DOCUMENTS

| 2,940,708 | A | | 6/1960 | Grimal |
|---|---|---|---|---|
| 4,174,900 | A | | 11/1979 | Ina |
| 4,196,881 | A | | 4/1980 | Davidson |
| 4,317,552 | A | | 3/1982 | Weidler |
| 5,172,113 | A | | 12/1992 | Hamer |
| 5,187,476 | A | | 2/1993 | Hamer |
| 5,202,683 | A | | 4/1993 | Hamer et al. |
| 5,495,243 | A | * | 2/1996 | McKenna ..................... 340/902 |
| 5,602,739 | A | | 2/1997 | Haagenstad et al. |
| 6,094,148 | A | | 7/2000 | Henry et al. |
| 6,124,647 | A | | 9/2000 | Marcus et al. |
| 6,252,519 | B1 | * | 6/2001 | McKenna ..................... 340/902 |
| 6,356,189 | B1 | * | 3/2002 | Fujimaki ..................... 340/465 |
| 6,572,233 | B1 | | 6/2003 | Northman et al. |
| 7,307,547 | B2 | | 12/2007 | Schwartz |
| 7,333,028 | B2 | | 2/2008 | Schwartz |
| 7,417,560 | B2 | | 8/2008 | Schwartz |
| 7,432,826 | B2 | | 10/2008 | Schwartz |
| 7,446,674 | B2 | * | 11/2008 | McKenna ..................... 340/902 |
| 7,515,064 | B2 | | 4/2009 | Schwartz |
| 7,573,399 | B2 | | 8/2009 | Schwartz |
| 7,952,491 | B2 | | 5/2011 | Schwartz et al. |
| 7,982,631 | B2 | | 7/2011 | Schwartz et al. |
| 8,054,200 | B1 | | 11/2011 | Nelson |
| 8,072,346 | B2 | | 12/2011 | Hall et al. |
| 8,325,062 | B2 | | 12/2012 | Johnson |
| 8,344,908 | B2 | | 1/2013 | Johnson |
| 8,487,780 | B2 | | 7/2013 | Edwardson |
| 8,610,596 | B2 | | 12/2013 | Johnson |
| 2006/0255966 | A1 | * | 11/2006 | McKenna ..................... 340/902 |
| 2007/0046499 | A1 | | 3/2007 | McKenna |
| 2007/0188348 | A1 | * | 8/2007 | Bauer et al. ................... 340/905 |
| 2009/0174571 | A1 | * | 7/2009 | McKenna ..................... 340/901 |

* cited by examiner

*Primary Examiner* — Julie Lieu

(57) ABSTRACT

A method for notifying a first driver of a first vehicle that a first responder is ahead of the first driver on a road and that the first responder is stopped on the road. The method employs an optical emitter and optical detector apparatus. The optical emitter may be in or on a police car and may be turned on when the police car is on the shoulder of a road, such as when an officer has pulled a motorist over. The optical detector apparatus is in or on a vehicle traveling toward the police car that is stopped on the shoulder of the road. The optical detector apparatus communicates with a warning device to sound or display a warning to the driver of the approaching vehicle.

19 Claims, 14 Drawing Sheets

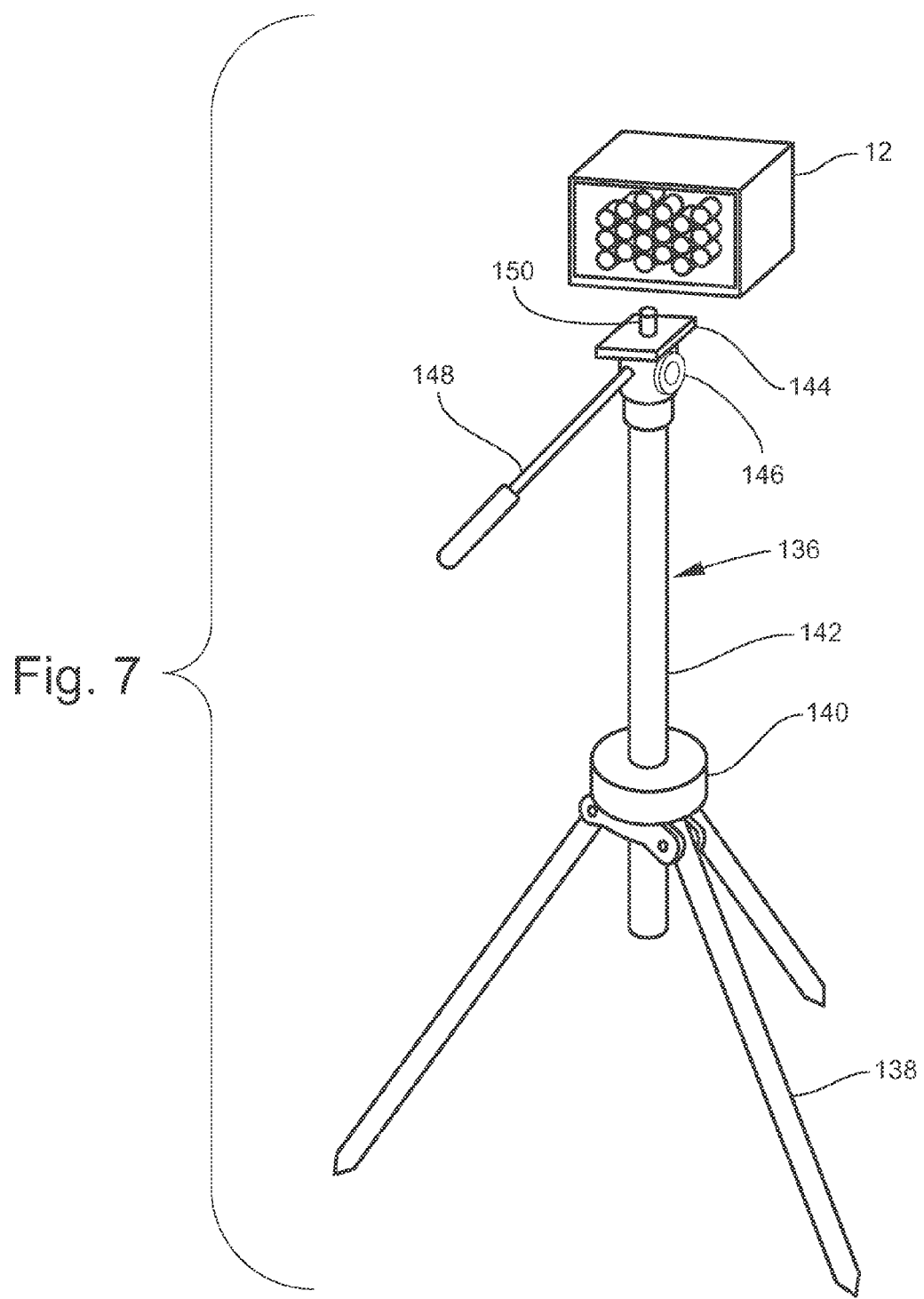

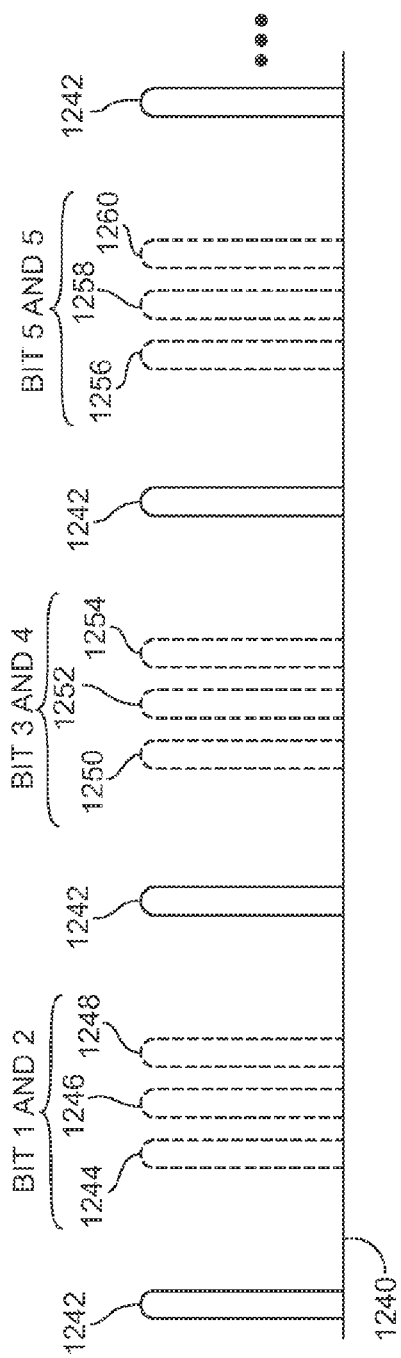
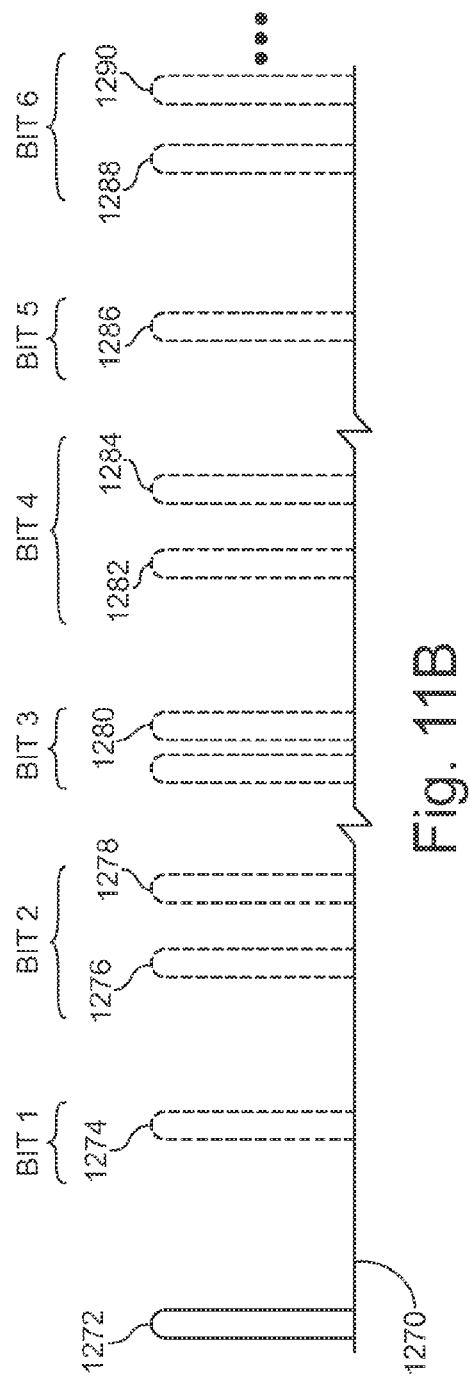

FIRST RESPONDERS' ROADWAY PRIORITY SYSTEM

This application claims the benefit under 35 U.S.C. 119(e) of the following U.S. provisional patent application numbers: 1) 61/754,566 filed Jan. 19, 2013, and 2) 61/813,633 filed Apr. 18, 2013, both of which are hereby incorporated by reference in their entireties into this application.

FIELD OF THE INVENTION

The present invention relates to a first responders' roadway priority system for getting cars out of the way by notifying a first driver of a first vehicle of a situation up ahead on the road, for moving cars toward the center of the road and away from the shoulder, and for broadcasting optical signals rearwardly and against the flow of traffic.

BACKGROUND OF THE INVENTION

The Opticom Priority Control System broadcasts optical signals forwardly from an authorized vehicle such as a police car, ambulance or fire engine. The optical signals communicate with light sensors at intersections so as change a green light to a red light to give priority to the authorized vehicles. A bus may be also be outfitted with the Opticom Priority Control System to forwardly throw out a low priority optical signal to change a red light to a green light at an intersection to permit, for example, a late bus to catch up to its normal schedule.

SUMMARY OF THE INVENTION

A feature of the present invention is a system or method for notifying a driver of a vehicle that a first responder is ahead of the driver on a road and that the first responder is stopped on the road.

Another feature of the present invention is a method for moving a first vehicle away from a first responder, such as away from a shoulder of a road.

Another feature of the present invention is the provision in a method for notifying a driver of a vehicle that a first responder is ahead of the driver on a road and that the first responder is stopped on the road, of the step of emitting a first optical signal against a flow of traffic and against a direction in which a first vehicle is traveling, the first optical signal being emitted from a location on or adjacent to the road such that the first optical signal impinges upon the first vehicle prior to the first vehicle reaching the location.

Another feature of the present invention is the provision in a method for notifying a driver of a vehicle that a first responder is ahead of the driver on a road and that the first responder is stopped on the road, of the step of detecting a first optical signal with a first detector in or on a first vehicle.

Another feature of the present invention is the provision in a method for notifying a driver of a vehicle that a first responder is ahead of the driver on a road and that the first responder is stopped on the road, of the step of determining whether a first optical signal is from a location forwardly of a first vehicle.

Another feature of the present invention is the provision in a method for notifying a driver of a vehicle that a first responder is ahead of the driver on a road and that the first responder is stopped on the road, of the step of providing a warning in a first vehicle to a driver of the first vehicle if the optical signal is from a location forwardly of a first vehicle, the warning being one of an audible warning and visible warning, and the warning informing the driver of the first vehicle of a situation at the forward location.

Another feature of the present invention is the provision in a method for notifying a driver of a vehicle that a first responder is ahead of the driver on a road and that the first responder is stopped on the road, of the step of distinguishing whether a first optical signal has been emitted from a position forwardly of a first vehicle or from a position rearwardly of the first vehicle.

Another feature of the present invention is the provision in a method for notifying a driver of a vehicle that a first responder is ahead of the driver on a road and that the first responder is stopped on the road, of the step of detecting a second optical signal with a second optical detector, the second optical detector being oriented opposite of a first optical detector such that the second optical detector is oriented to detect optical signals being emitted in a direction opposite that of the direction for which the first optical detector is oriented.

Another feature of the present invention is the provision in a method for notifying a driver of a vehicle that a first responder is ahead of the driver on a road and that the first responder is stopped on the road, of the step of detecting a second optical signal with a second optical detector, the second optical detector being capable of picking up an optical signal originating from generally anywhere in a 360 degree horizontal range about the second optical detector, such that the second optical detector is capable of picking up said second optical signal where said second optical signal originates from one of a forward position of said first vehicle, a rearward position or said first vehicle, or a position disposed between said forward and rearward positions.

Another feature of the present invention is the provision in a method for notifying a driver of a vehicle that a first responder is ahead of the driver on a road and that the first responder is stopped on the road, of the step of detecting a second optical signal with a second optical detector, the second optical detector being capable of picking up an optical signal originating from generally anywhere in a 360 degree horizontal range about the second optical detector, the second optical detector having a cylindrical photosensitive surface, where the cylindrical photosensitive surface is disposed generally vertically.

Another feature of the present invention is the provision in a method for notifying a driver of a vehicle that a first responder is ahead of the driver on a road and that the first responder is stopped on the road, of the step of providing a warning including a concept associated with a request that a driver move the first vehicle away from the shoulder of the road.

Another feature of the present invention is the provision in a method for notifying a driver of a vehicle that a first responder is ahead of the driver on a road and that the first responder is stopped on the road, of the step of providing a warning including a concept associated with information that there is a situation up ahead on or adjacent to the shoulder of the road.

Another feature of the present invention is the provision in a method for notifying a driver of a vehicle that a first responder is ahead of the driver on a road and that the first responder is stopped on the road, of the step of emitting a first optical signal including the step of selecting a set of optical pulses to emit a first optical signal.

Another feature of the present invention is the provision in a method for notifying a driver of a vehicle that a first responder is ahead of the driver on a road and that the first responder is stopped on the road, of the step of emitting a first optical signal including the step of emitting an infrared light signal.

Another feature of the present invention is the provision in a method for notifying a driver of a vehicle that a first responder is ahead of the driver on a road and that the first responder is stopped on the road, of the step of selecting a base for said first optical signal, with the base being selected being a second vehicle, a bank of lights on a second vehicle, or a tripod.

Another feature of the present invention is an optical detector apparatus in or on a vehicle for detecting optical signals emitted from a location forwardly of the vehicle.

Another feature of the present invention is the provision in an optical detector apparatus in or on a vehicle for detecting optical signals emitted from a location forwardly of the vehicle, of the optical detector apparatus being housed in a rearview mirror.

Another feature of the present invention is an optical detector apparatus in or on a first vehicle for detecting first and second optical signals, where a first signal is emitted from a direction forwardly of the optical detector apparatus and where the second optical signal is being emitted from generally anywhere within a 360 degree horizontal range of the optical detector apparatus.

Another feature of the present invention is the provision in an optical detector apparatus in or on a first vehicle for detecting optical signals being emitted in opposite directions, of first and second optical detectors, the first and second optical detectors being oriented opposite of each other to sense optical signals being emitted in opposite directions.

Another feature of the present invention is the provision in an optical detector apparatus in or on a first vehicle for detecting first and second optical signals, of a second optical detector, the second optical detector being oriented to pick up a second optical signal being emitted toward the first vehicle from a second location generally anywhere in a 360 degree horizontal range about the second optical detector, the warning device capable of issuing a second warning in response to a communication from the microcontroller that is associated with the second optical detector, the second warning comprising a concept associated with a second situation at said second location of the first vehicle.

Another feature of the present invention is the provision in an optical detector apparatus in or on a first vehicle for detecting first and second optical signals, of a second optical detector, the second optical detector being oriented to pick up a second optical signal being emitted toward the first vehicle from a second location generally anywhere in a 360 degree horizontal range about the second optical detector, the second optical detector having a cylindrical photosensitive surface that is oriented generally vertically.

Another feature of the present invention is the provision in an optical detector apparatus in or on a first vehicle for detecting first and second optical signals being emitted from the same direction, opposite directions, or different directions, of a microcontroller in communication with first and second optical detectors and issuing a warning or warnings in response to the first and second optical signals.

Another feature of the present invention is the provision in an optical detector apparatus in or on a first vehicle for detecting first and second optical signals being emitted from the same direction, opposite directions, or different directions, of a warning device in communication with the microcontroller, the warning device being one of an audio warning device and visual warning device, the warning device issuing a first warning in response to a communication from the microcontroller that is associated with the first optical detector, and the warning device issuing a second warning in response to a communication from the microcontroller that is associated with the second optical detector.

Another feature of the present invention is the provision in an optical detector apparatus in or on a first vehicle for detecting optical signals being emitted from the same direction, opposite directions, or different directions, of the first warning including a concept associated with a situation at a first location forwardly of a position of the first vehicle, and of the second warning including a concept associated with a situation at a second location rearwardly of a position of the first vehicle, frontwardly of a position of the first vehicle, or a position generally anywhere between the frontward position and rearward position.

Another feature of the present invention is an optical emitter apparatus on a tripod.

Another feature of the present invention is the provision in an optical emitter apparatus on a tripod, of the tripod including three legs, each of the legs having a proximal end and a distal end, the proximal ends confronting each other when the tripod is in a stand alone configuration, the distal ends being spaced apart from each other when the tripod is in the stand alone configuration, and a pulsing light optical emitter on the tripod when the tripod is in the stand alone configuration.

Another feature of the present invention is the provision in an optical emitter apparatus on a tripod, of a pulsing light optical emitter emitting infrared light.

Another feature of the present invention is the provision in an optical emitter apparatus on a tripod, of a pulsing light optical emitter emitting pulses in a range between 10 and 30 hertz.

Another feature of the present invention is an optical emitter apparatus for a vehicle having a driver's door, a driver's seat, a transmission, a selector lever in a selector lever unit, and a parking brake.

Another feature of the present invention is the provision in an optical emitter apparatus, of a first optical emitter on or in the vehicle, the first optical emitter emitting a first optical signal, the first optical emitter being oriented rearwardly such that the first optical signal is emitted rearwardly of the vehicle.

Another feature of the present invention is the provision in an optical emitter apparatus, of a first enabling switch for a first optical emitter, the first enabling switch when active permitting a first optical signal to be generated when a condition from the following set of conditions occurs: the condition of the driver's door being opened which operates a door switch, the condition of the driver of the car getting off the driver's seat which operates a driver's seat switch, the condition of the transmission being placed in park which operates an internal transmission switch, the condition of the selector lever of the selector lever unit being placed in park which operates a selector lever switch, the condition of the parking brake being set which operates a parking brake switch.

Another feature of the present invention is the provision in an optical emitter apparatus, of a second optical emitter on or in the vehicle, the second optical emitter emitting a second optical signal, the second optical emitter being oriented forwardly such that the second optical signal is emitted forwardly of the vehicle.

An advantage of the present invention is that it saves lives. Whereas a "move over" law is a legal instrument, the present invention is a practical instrument that may increase the chances of a motorist moving away from the shoulder, thereby saving perhaps three lives: the life of a first responder or an officer at the driver side window of a car he or she just pulled over, the life of the motorist pulled over, and the life of the driver being warned.

Another advantage of the present invention is that the optical detector apparatus may be manufactured inexpensively, such as for perhaps less than one dollar in parts.

Another advantage of the present invention is that this first responders' roadway priority system utilizes existing technology of the first responders' ambulances, fire trucks, police cars, etc. These vehicles have optical emitters that send optical signals to intersections to change the lights of these intersections as the first responder approaches these intersections. Governmental entities need make no further investment in the base technology. This base technology is already in existence for changing lights at intersections.

Another advantage is that the communication system herein between optical emitters and optical detectors is a communication system that can operate during a power blackout, a national disaster, or a natural disaster. In contrast, other traffic management systems depend upon the power grid.

BRIEF DESCRIPTION OF THE DRAWINGS

FIG. 7 is a detail perspective view of the tripod mounted optical emitter of FIG. 1.

FIGS. 10A, 10B, 10C, 11A, and 11B illustrate optical pulses transmitted between an emergency vehicle having an optical emitter and a civilian vehicle having an optical detector apparatus for communication between the emergency vehicle and civilian vehicle.

DETAILED DESCRIPTION

Figure 1:
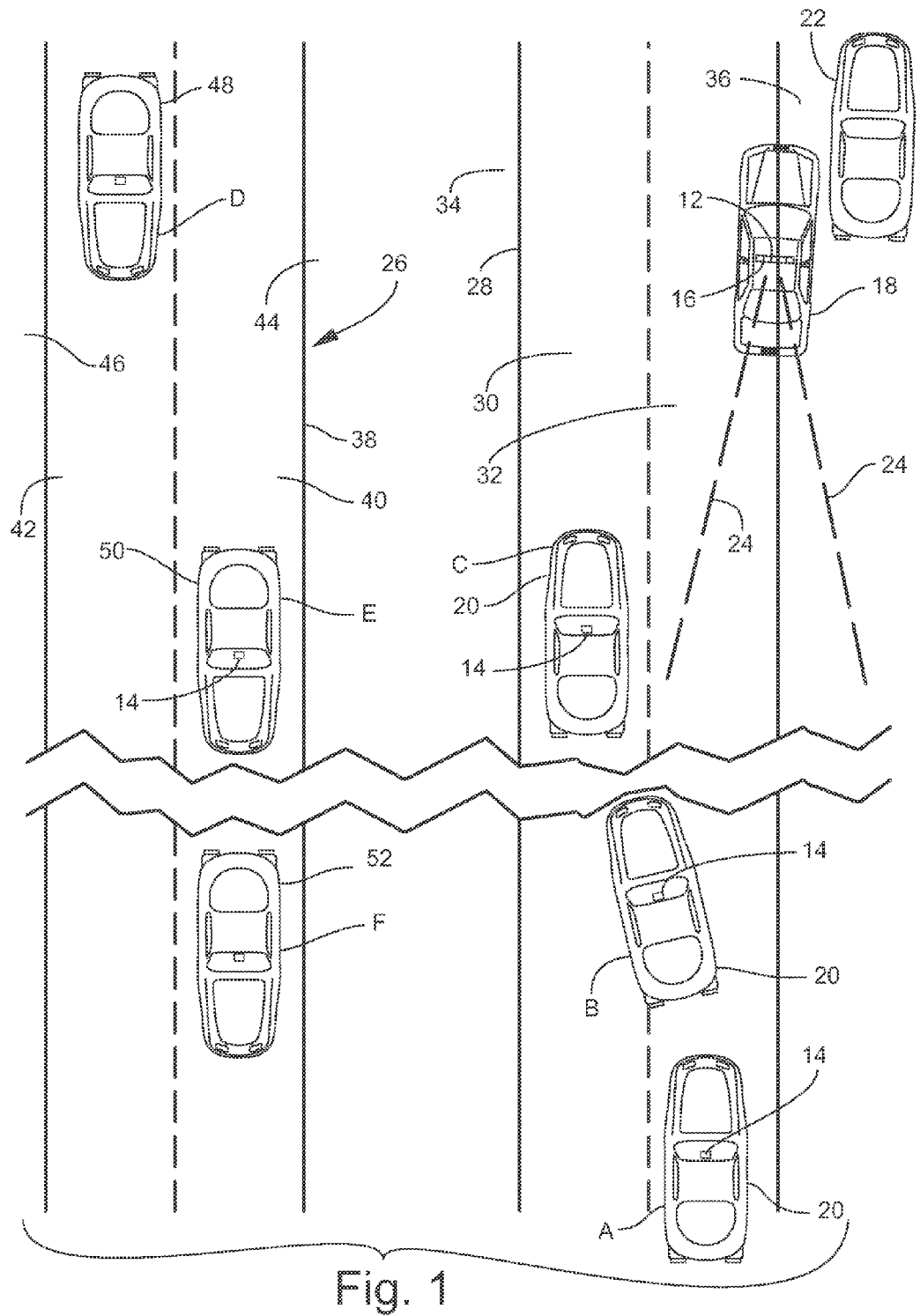
FIG. 1 is a top diagrammatic view of the present first responders' roadway priority system or rearwardly oriented emergency warning system and shows a police car emitting an optical signal rearwardly to approaching cars as far away as about 2500 feet.

As shown in FIG. 1, the present first responders' roadway priority system or backwards emergency warning system is indicated in general by reference numeral 10. The system 10 includes an optical emitter 12 and an optical detector apparatus 14. The optical emitter 12 emits first optical signals 24 rearwardly against the flow of traffic and rearwardly from a light bar 16 of a first responder's vehicle or police car 18. The optical detector apparatus 14 is mounted on or in a civilian vehicle 20 such as a car or truck or motorcycle and receives such optical signals 24.

As further shown in FIG. 1, the police car 18 has pulled over a motorist in a third vehicle 22. The officer driving the police car 18 may turn on the optical emitter 12 prior to stepping out of his or her vehicle 18. The optical emitter 12 then emits first optical signal 24 that may take on a cone shape when emitted. The optical detector apparatus 14 then picks up the first optical signal 24, then processes the first optical signal 24 to determine if the optical signal 24 has been emitted from a position forwardly of the vehicle 20, and then generates one or both of an audio or visual warning to the driver of the vehicle 20. The warning may inform the driver of vehicle 20 that there is a situation ahead and that the driver may wish to move his or her vehicle away from the shoulder of the road. A first reason why the optical detector apparatus 14 may issue a warning to the driver of vehicle 20 of a first responder up ahead on the roadway is because such rearwardly directed optical signal has been picked up by a frontwardly directed optical detector on the optical detector apparatus 14 to the exclusion of other optical detectors on the optical detector apparatus 14, with such information being processed by the microcontroller of the optical detector apparatus 14. A second reason is that other optical detectors, such as those oriented rearwardly or sidewardly, may be programmed to ignore the specific code or optical signal being broadcast by the first responder up ahead. Other optical detectors on the optical detector apparatus 14, such as those optical detectors oriented sidewardly or rearwardly, may not be hard wired or programmed to recognize the rearwardly directed optical signal. For example, all optical detectors on the optical detector apparatus 14 may be hard wired or programmed to issue warnings upon receiving an optical signal having a strobe frequency of 14 pulses per second, and this set of optical detectors may be oriented frontwardly, rearwardly or sidewardly. However, only those optical detectors on the optical detector apparatus 14 that are oriented forwardly may be hard wired or programmed or have the capability to pick up and issue a warning in response to an optical signal having a strobe frequency of 17 pulses per second. Frontwardly oriented optical detectors on the optical detector apparatus 14 may be exclusively programmed to issue warnings in response to certain optical codes and these certain codes may carry the information that a first responder is on or adjacent to the road and has stopped. All optical detectors on the optical detector apparatus 14 can be programmed to issue warnings in response to certain other optical codes, such as an emergency vehicle being in the area and traveling on a road in the area where, for example, the emergency vehicle is behind, to the sides, or to the front of the vehicle having the optical detector apparatus 14.

As further shown in FIG. 1, the method 10 may be employed on a divided highway 26. The divided highway 26 includes a first roadway 28 having two lanes 30, 32. Lane 30 has a shoulder 34. Lane 32 has shoulder 36. The divided highway includes a second roadway 38 having two lanes 40, 42. Lane 40 has a shoulder 44. Lane 42 has a shoulder 46. The method 10 may be employed on an undivided city street.

Reference character A in FIG. 1 indicates a first location for vehicle 20, where vehicle 20 is about 2500 feet away from optical emitter 12 and the police car 18. Reference character B in FIG. 1 indicates a subsequent location for vehicle 20, where vehicle 20 is a car length or two less than 2500 feet away from optical emitter 12. At location B, the optical detector apparatus 14 has received and processed the first optical signal 24 and the vehicle 20 is in the process of moving from lane 32 into lane 30 and thus away from the shoulder 36 and away from the police car 18. Reference character C in FIG. 1 indicates a still subsequent location for vehicle 20, where vehicle 20 has traveled almost 2500 feet and is presently relatively close to the police car 18 albeit in lane 30, safely away from the police car 18 which is located partially in lane 32 and partially in the shoulder 36, where the police car 18 shields the pulled over vehicle 22, which is parked on the shoulder 36.

Figure 9A:
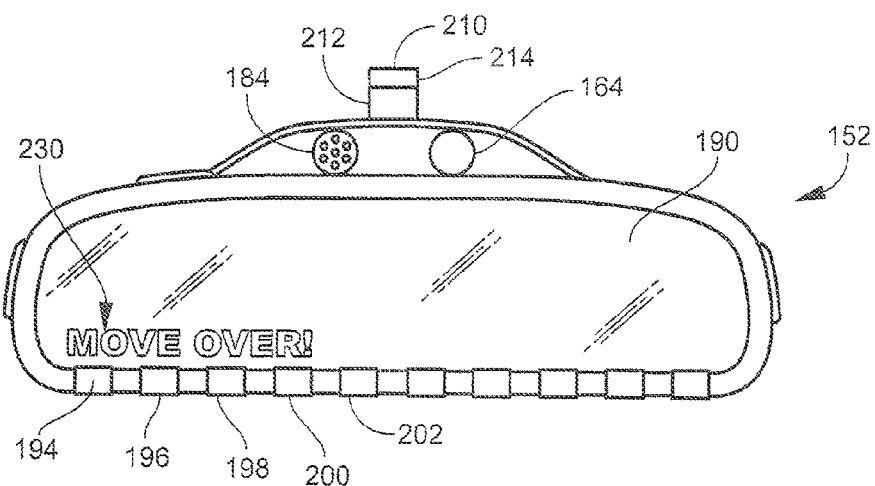
FIG. 9A is a front view of the optical detector apparatus of FIG. 8A having a cylindrically shaped optical detector that picks up optical signals over a horizontal range of 360 degrees.
Figure 9B:
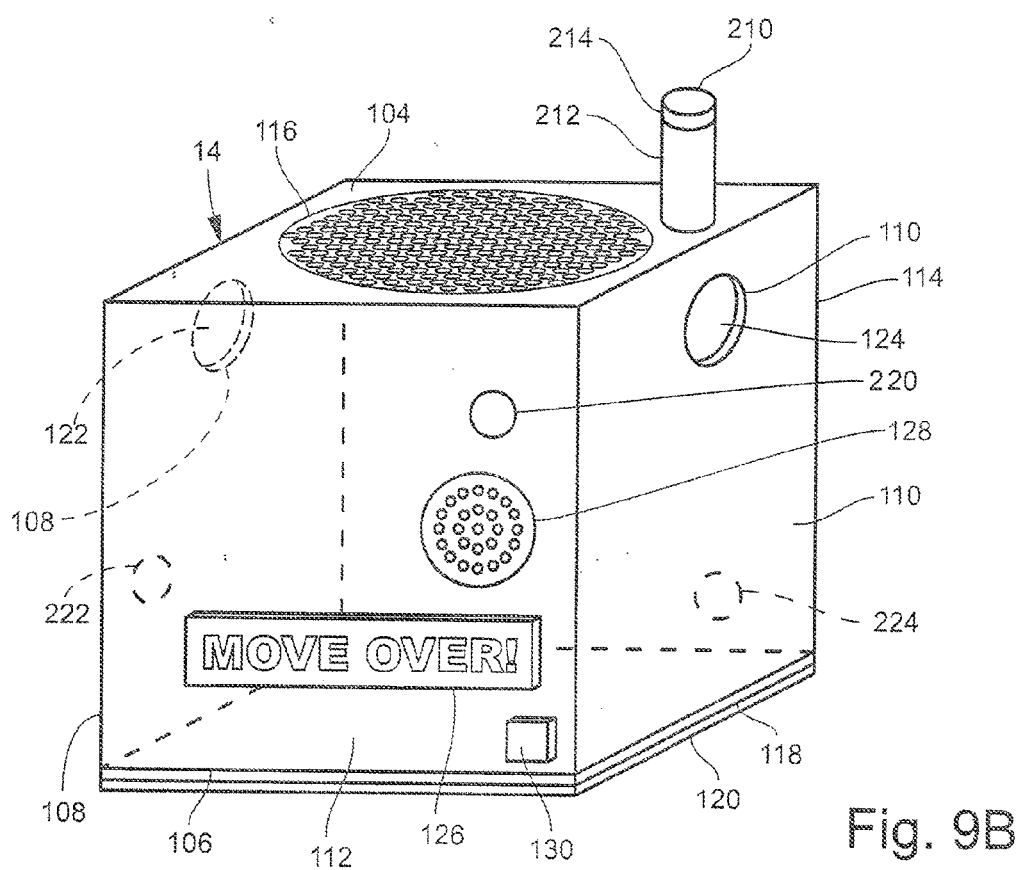
FIG. 9B is a perspective view of the optical detector of FIG. 5 having a cylindrically shaped optical detector that picks up optical signals over a horizontal range of 360 degrees.

On the other side of the divided highway 26, away from the police car 18 and its optical emitter 12, lies roadway 38. Vehicles 48, 50 and 52 are at respective locations D, E and F on roadway 38. Vehicle 48 at location D is relatively directly across from police car 18 and is not in the cone of the first optical signal 24. Vehicle 50 at location E is slightly rearwardly of and across from police car 18 and is not in the cone of the first optical signal 24. Vehicle 52 is about 2500 feet rearwardly of the police car 18 and may be in the cone of the first optical signal 24. However, the frontwardly oriented portion of the optical detector apparatus 14 does not pick up the first optical signal 24. The first optical signal 24 does not impinge upon the frontwardly oriented portion of the optical detector apparatus 14. In one embodiment of the invention, only the frontwardly oriented portion 122 of the optical detector apparatus 14 is wired or programmed through a microcontroller to recognize and emit warnings in response to first optical signals emitted rearwardly from authorized vehicles; in this embodiment of the invention, the rearwardly oriented portion or second optical detector 124 is associated with a microcontroller such that second optical signals picked up by optical detector 124, when processed, emit warnings about moving and active authorized vehicles that are rearwardly of the civilian vehicle 20. As shown in FIGS. 9A and 9B, second optical detectors 210, 220, 222, 224, along with optical detector 124, detect a second optical signal that is being emitted from a horizontal range of 360 degrees about the apparatus 14 or 152. It should be noted that the first optical signal is different from the second optical signal. First optical signal may be, for example, 14 pulses of light per second. Second optical signal may be, for example, 17 pulses of light per second. The first optical signal may carry a first package of information. The second optical signal may carry a second package of information.

Figure 2:
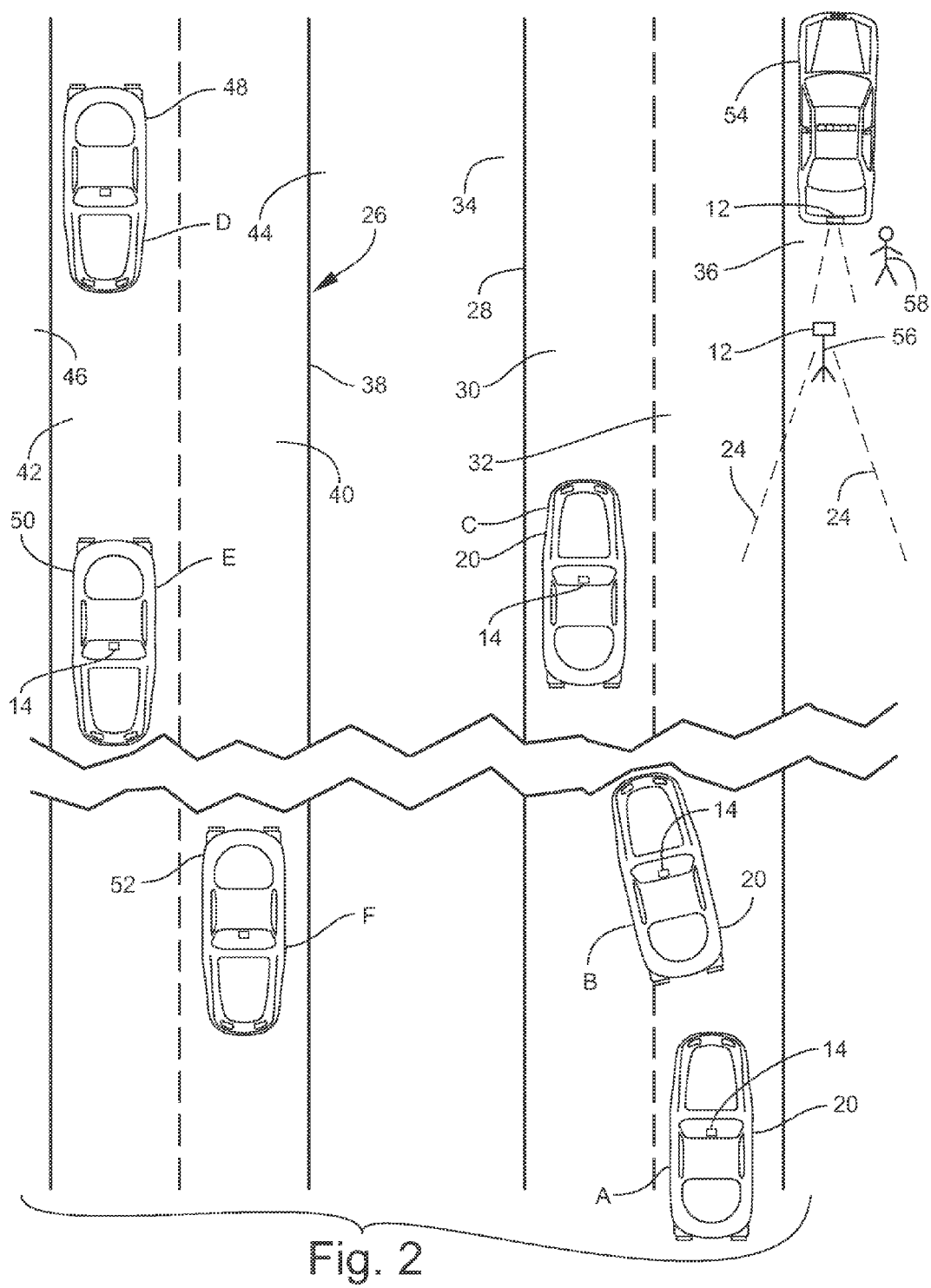
FIG. 2 is a top diagrammatic view of the present first responders' roadway priority system or rearwardly oriented emergency warning system and shows both a utility truck mounted optical emitter and tripod mounted optical emitter emitting an optical signal rearwardly to approaching cars as far away as about 2500 feet.

FIG. 2 shows the undivided highway 26, roadways 28, 38, lanes 30 and 32 on roadway 28, lanes 40, 42 on roadway 38, shoulders 34 and 36 on roadway 28, and shoulders 44 and 46 on roadway 38. FIG. 2 also shows vehicle 20 and the relative locations A, B, and C of vehicle 20. FIG. 2 also shows vehicles 48, 50 and 52 and their respective locations D, E, and F. Instead of responding to an optical emitter 12 mounted on a light bar 16 of a police car 18, optical emitter 12 may be mounted on an authorized truck 54 such as a utility truck or department of transportation truck or on a tripod 56. Reference number 58 indicates a person such as a utility worker or highway worker. Person 58 may position the tripod 56 such that the optical emitter 12 emits the first optical signal 56 against the flow of traffic. As with optical emitter 12 mounted on the light bar 16 of a police car 18, optical emitters 12 mounted on the authorized truck 54 and tripod 56 may cast the first optical signal 24 to a location about 2500 feet away where vehicles 20 are proceeding toward the truck 54 or tripod 56 such that vehicle 20 may move away from the shoulder 36 where the person 58 is working and where the authorized truck 54 or tripod 56 is parked.

Figure 3:
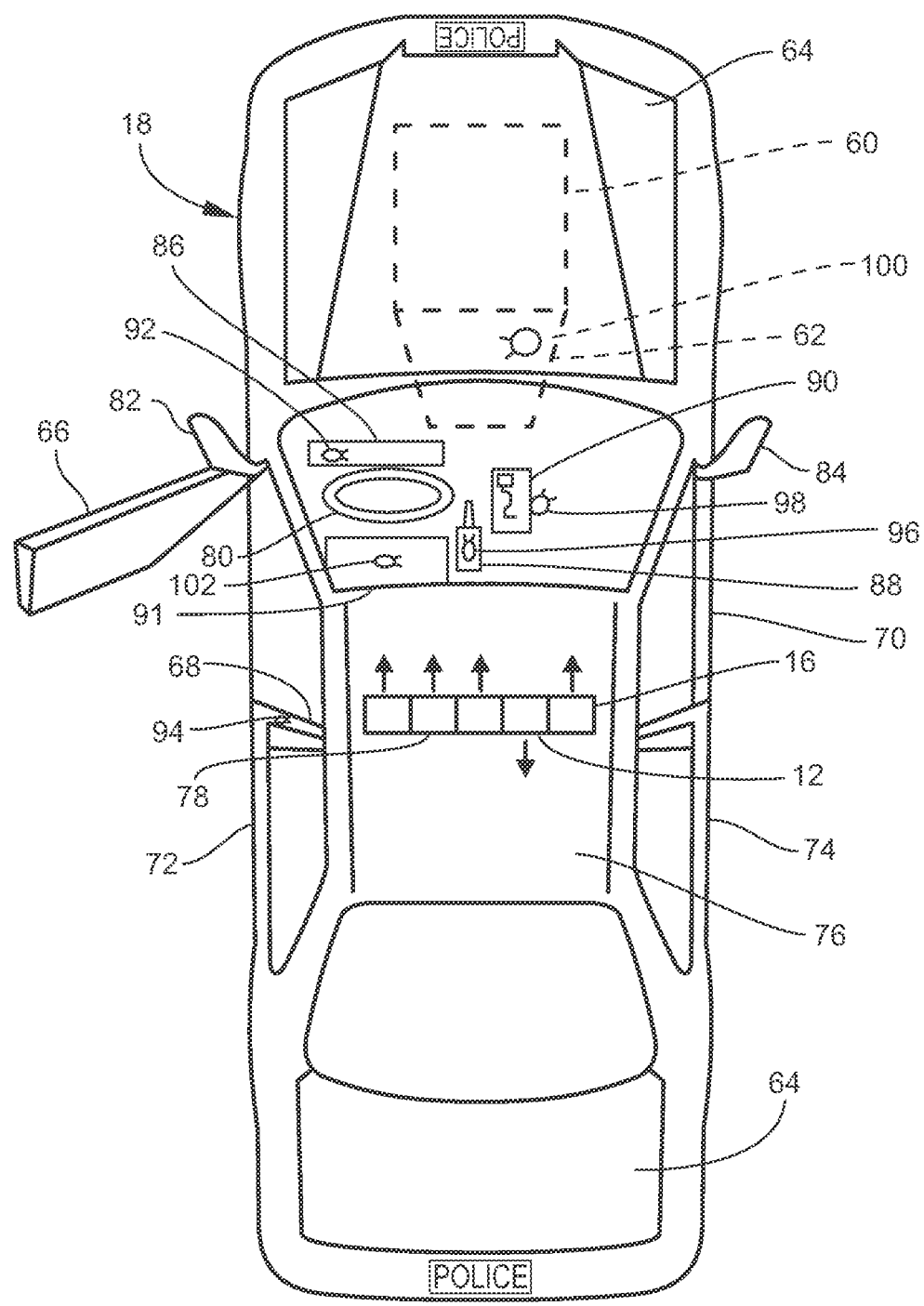
FIG. 3 is a top diagrammatic view of the police car of FIG. 1 and shows how a rearwardly oriented optical emitter may be automatically and selectively turned on when the police officer stops his or her car, such as when pulling over a motorist on the side of the road.

FIG. 3 shows the police car 18. Police car 18 includes an engine 60 and transmission 62 mounted under a hood 64 at a front of the police car 18. A rear of the police car 18 includes a trunk lid 64. Police car 18 further includes a driver's side door 66 and a driver's side door jam or door post 68. Police car 18 further includes a front passenger's door 70, a left side rear passenger door 72 and a right side passenger door 74. Police car 18 further includes a roof 76. Light bar 16 is mounted on the roof 76. Rearwardly oriented optical emitter 12 is mounted on the light bar 16 and is aimed in the rearward direction. Light bar 16 includes a set of four frontwardly directed optical emitters 78 for throwing the second optical signal. Police car 18 further includes a steering wheel 80, a left side mounted rear view mirror 82, and a right side mounted rear view mirror 84. Police car 18 further includes an instrument panel 86, a parking brake 88, a transmission selector lever unit 90, and a driver's seat 91 immediately rearwardly and under the steering wheel 80.

Police car 18 further includes a manually operated switch 92 on the instrument panel 86 for turning on and off the rearwardly directed optical emitter 12 that casts the first optical signal. This step is illustrated by reference character G in FIG. 4. The officer driver of the police car 18 may turn on the manual switch 92 prior to exiting the police car 18 or while he or she is standing outside of the police car 18 next to door 66, such as when the door 66 is open or such as when the door 66 is closed and the window of the door 66 is open. Or the police officer may turn on the manually operated switch 92 at another time, such as when he or she is slowing down in traffic and about to stop.

Police car 18 further includes a set of selectively enabled switches 94, 96, 98, 100, 102. Any one of these switches 94, 96, 98, 100, 102 may be selectively turned on (made active) or selectively turned off (made inactive). In other words, each of these switches 94, 96, 98, 100, 102 has an active mode and an inactive mode. These modes may be preset, such as by the police officer when the police officer begins his or her shift for the day. Or these modes may be preset by the police officer's commander. Or these modes may be turned on and off by the police officer as he or she desires. The switches 94, 96, 98, 100, 102 may be made active or inactive as a unit by closing or opening a single switch.

In the active mode, the action of the door 66 being opened closes switch 94 and turns on the rearwardly oriented optical emitter 12. This step is illustrated by reference character H in FIG. 4. The emitter 12 may then stay on for a predetermined amount of time even if the door 66 is closed by the officer after the officer exits the police car 18.

In the active mode, the action of setting the parking brake 88 closes switch 96 and turns on the rearwardly oriented optical emitter 12. This step is illustrated by reference character J in FIG. 4. The emitter 12 may then stay on for a predetermined amount of time or the emitter 12 may be turned off when the parking brake 88 is released.

In the active mode, the action of moving the selector lever of the selector lever unit 90 to the park position closes switch 98 and turns on the rearwardly oriented optical emitter 12. This step is illustrated by reference character K in FIG. 4. The emitter 12 may then stay on for a predetermined amount of time or the emitter 12 may be turned off when the selector lever of the selector lever unit 90 is moved to the drive slot, or to a nonpark slot, of the selector lever unit 90.

In the active mode, a predefined action internally in the transmission 62 closes switch 100 and turns on the rearwardly oriented optical emitter 12. This step is illustrated by reference character I in FIG. 4. The emitter 12 may then stay on for a predetermined amount of time or the emitter may be turned off when the transmission moves into drive, neutral, or reverse.

In the active mode, the action of the police officer getting off the driver's seat 102 closes the driver's seat switch 102 and turns on the rearwardly oriented optical emitter 12. This step is illustrated by reference character L in FIG. 4. The emitter 12 may then stay on for a predetermined amount of time or the emitter 12 may be turned off when the police officer returns to his or her police car 18 and sits down in seat 91.

Figure 4:
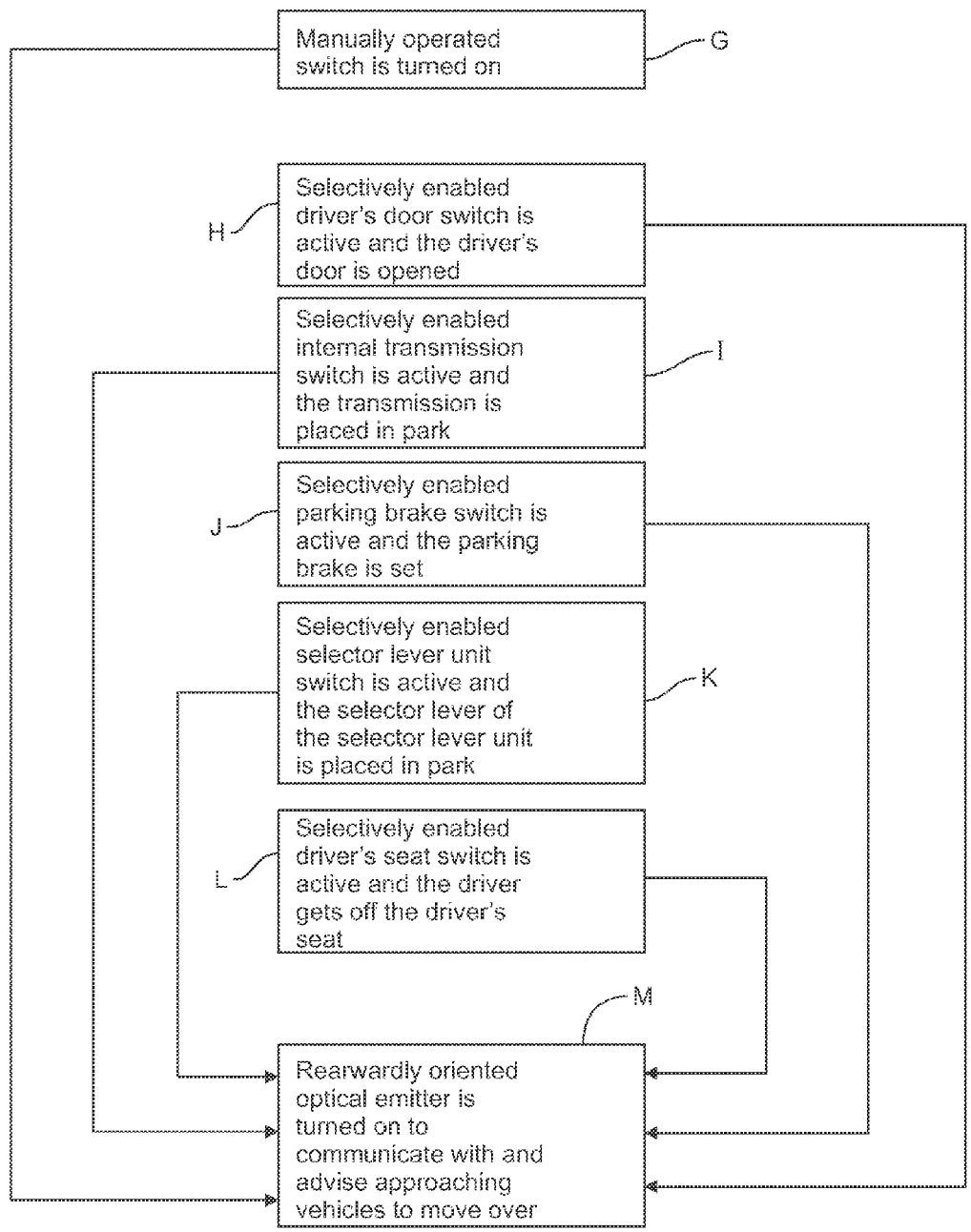
FIG. 4 is a flow chart showing how the police car of FIG. 3 automatically and selectively turns on the rearwardly oriented optical emitter when the police officer stops his or her car to pull over a motorist on the side of the road.

The step of the rearwardly oriented optical emitter being turned on is illustrated by reference character M in FIG. 4.

In the inactive mode for switches 94, 96, 98, 100, 102, none of the positive actions described above results in a closing of the respective switches 94, 96, 98, 100, 102 such that none of the positive actions will result in a turning on of the rearwardly oriented optical emitter 12. In such inactive mode, the switches 94, 96, 98, 100, 102 may be mechanically responsive to the positive action, but the respective software or circuitry does not permit the rearwardly oriented optical emitter 12 to turn on.

As to the optical emitter 12 (engaged to police car 18, to the utility truck 54, or to tripod 136) and as to system 10 as a whole, the following U.S. Patents are hereby incorporated by reference: 1) the Nelson U.S. Pat. No. 8,054,200 B1 issued Nov. 8, 2011 and entitled Control Apparatus, Method, And Algorithm For Turning On Warning In Response To Strobe; 2) the Schwartz et al. U.S. Pat. No. 7,952,491 B2 issued May 31, 2011 and entitled Optical Traffic Control System With Burst Mode Light Emitter; 3) the Schwartz et al. U.S. Pat. No. 7,982,631 B2 issued Jul. 19, 2011 and entitled LED Emitter For Optical Traffic Control Systems; and 4) the Hall et al. U.S. Pat. No. 8,072,346 B2 issued Dec. 6, 2011 and entitled LED Light Bar For Optical Traffic Control Systems.

The optical emitter 12 may generate first optical signals or light pulses at a predetermined rate such as 11, 12, 13, 16, 17 or 18 Hz or another rate between 10 Hz and 30 Hz. The optical emitter 12 may be a high power strobe xenon or halogen emitter that generates broad spectrum light or that generates bursts of pulses from an LED source. While a high power strobe tube having a xenon lamp may require significant power to operate, such as about 30 W, an LED source for an LED optical emitter generating bursts of pulses may require only 3 W and may be powered by a small 9 volt battery. Another advantage of an LED optical emitter is that it emits light in a relatively narrow band of wavelengths that can be matched to the characteristics of the optical detectors of the optical detector apparatus 14. Whether the optical emitter 12 is a high power strobe that generates a broad spectrum of light or an LED optical emitter, the first optical signal or signals generated for pick up by the optical detector apparatus 14 may have a number of features through which the optical emitter 12 may communicate with the optical detector apparatus 14. These features include: the number of flashes per given period of time or the frequency of the flashes, the individual durations of the flashes, waveshapes, and intervals, and such features can be controlled and manipulated by the software or circuitry of the optical emitter 12.

Figure 5:
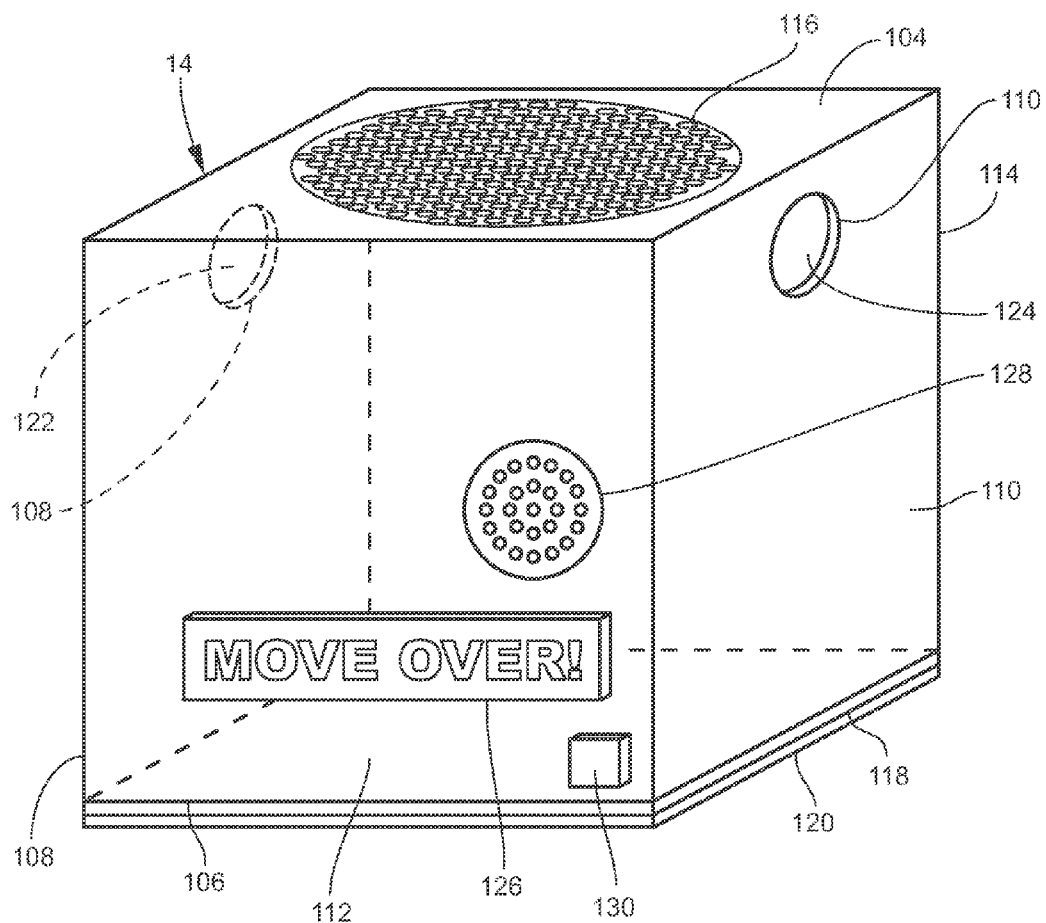
FIG. 5 is a perspective diagrammatic view of the optical detector apparatus of the present invention that is located inside of a vehicle and includes both forwardly and rearwardly oriented optical detectors.

FIG. 5 shows the present optical detector apparatus 14. The optical detector apparatus 14 may take any one of a variety of shapes and sizes. In FIG. 5, the optical detector apparatus 14 is shown in a cube form having six sides, namely, an upper side 104, a lower side 106, a front side 108, a rear side 110, a driver's side 112, and a passenger's side 114. In FIGS. 8A, 8B, 8C, and 8D, the optical detector apparatus 14 takes the form of a rearview mirror and its associated components such as an associated component confronting the windshield and/or traveling upwardly therefrom.

The upper side 104 includes a speaker or warning device 116 anchored thereon.

The lower side 106 is opposite of the upper side 104. A layer of adhesive 118 is engaged to the lower side 106. A peel off liner or cover 120 is removably engaged to the layer of adhesive 118. After the liner 120 is removed, the optical emitter 14 may be stuck to, for example, the dashboard of car 20 where there is a reasonable line of sight forwardly through the front windshield and rearwardly through the rear windshield. According to the present method, the front side 108 is oriented forwardly and the rear side 110 is oriented rearwardly.

The front side 108 includes a first optical detector 122. The optical detector 122 is mounted at a location that is equidistant from sides 112 and 114 and that is adjacent to or confronting upper side 104. Optical detector 122 is mounted relatively closely to the upper side 104 to place the optical detector 122 at a relatively high location in the car 20 to maximize the line of sight forwardly so as to maximize a pick up of first optical signals emitted rearwardly from an optical emitter that is located forwardly of the car 20. Optical detector 122 is mounted in a recessed or inwardly fashion relative to a front face of front side 108 so as to minimize a pick up of optical signals having an origin toward the side of car 20 or other ambient light. As indicated in FIG. 9B, front side 108 may include an optical detector 222 for detecting second optical signals generated by an emergency vehicle that is both active and moving.

The rear side 110 is located opposite of the front side 108. The rear side 110 includes a second optical detector 124. The optical detector 124 is mounted at a location that is equidistant from sides 112 and 114 and that is adjacent to or confronting upper side 104. Optical detector 124 is mounted relatively closely to the upper side 104 to place the optical detector 124 at a relatively high location in the car 20 to maximize the line of sight rearwardly so as to maximize a pick up of second optical signals emitted forwardly from an optical emitter that is located rearwardly of the car 20. Optical detector 124 is mounted in a recessed or inwardly fashion relative to a rear face of rear side 110 so as to minimize a pick up of optical signals having an origin toward the side of the car 20 or other ambient light.

The driver's side 112 includes a visual display or warning device 126. The driver's side 112 is the side of the cube 14 that is closest to the driver and locating the visual display 126 on the driver's side 112 minimizes the distance between the visual display 126 and the eyes of the driver. Locating the visual display 126 on the driver's side 112 further maximizes the directness of the line of sight between the eyes of the driver and the visual display 126. If desired, the speaker or warning device 116, or a second speaker or warning device 128, can be mounted on the driver's side 112 so as to minimize the distance between a speaker and the ears of the driver. Visual display 126 can be a digital display that displays phrases such as "move over." Visual display 126 projects outwardly of side 112 so as to take on a three dimensional characteristic such that, for example, if it is selected that the visual display 126 will flash a color such as red, then five sides of the visual display 126 can flash red. Visual display 126 thus takes on the nature of a bulb and will therefore be more noticeable to a driver than, for example, a visual display disposed in a flush or flat nature on side 112.

Driver's side 112 further includes an electronic button 130. Button 130 may be an on/off switch. Warnings issued by the speaker 116, visual display 126, and speaker 128 may become monotonous and irritating, and button 130 may be employed to turn off the warning devices. However, a time delay function may be built in such that, after a period of time, the optical detector apparatus 14 will become active again and ready to pick up and issue further warnings. Button 130 may control the language of the phrases displayed by the visual display 126 or the language spoken by the speaker 116. Languages displayed or spoken may be, for example, English or Spanish or some other language. Optical detector apparatus 14 may be continually on, or may be on only when the car 20 is turned on, and button 130 may turn off one or all of the warning devices 116, 126 and 128 for a period of time after the optical detector apparatus 14 generates an alarm and emits a sound or warning through one of the warning devices 116, 126, 128. Driver's side 112 or another side of the cube 14 may include one or more additional buttons 130 for additional functions.

As indicated in FIG. 9B, driver's side 112 may include an optical detector 220 for detecting second optical signals originating from a location beyond the driver's side of the vehicle and generated by an emergency vehicle that is both active and moving.

Passenger's side 114 is opposite driver's side 112. As indicated in FIG. 9B, front passenger side 114 may include an optical detector 224 for detecting second optical signals stemming from a location beyond the front passenger's side of the vehicle and generated by an emergency vehicle that is both active and moving.

Optical detector apparatus 14 may have a power source contained internally therein or may have a connection to another power source such as to the battery of the car 20.

Figure 6:
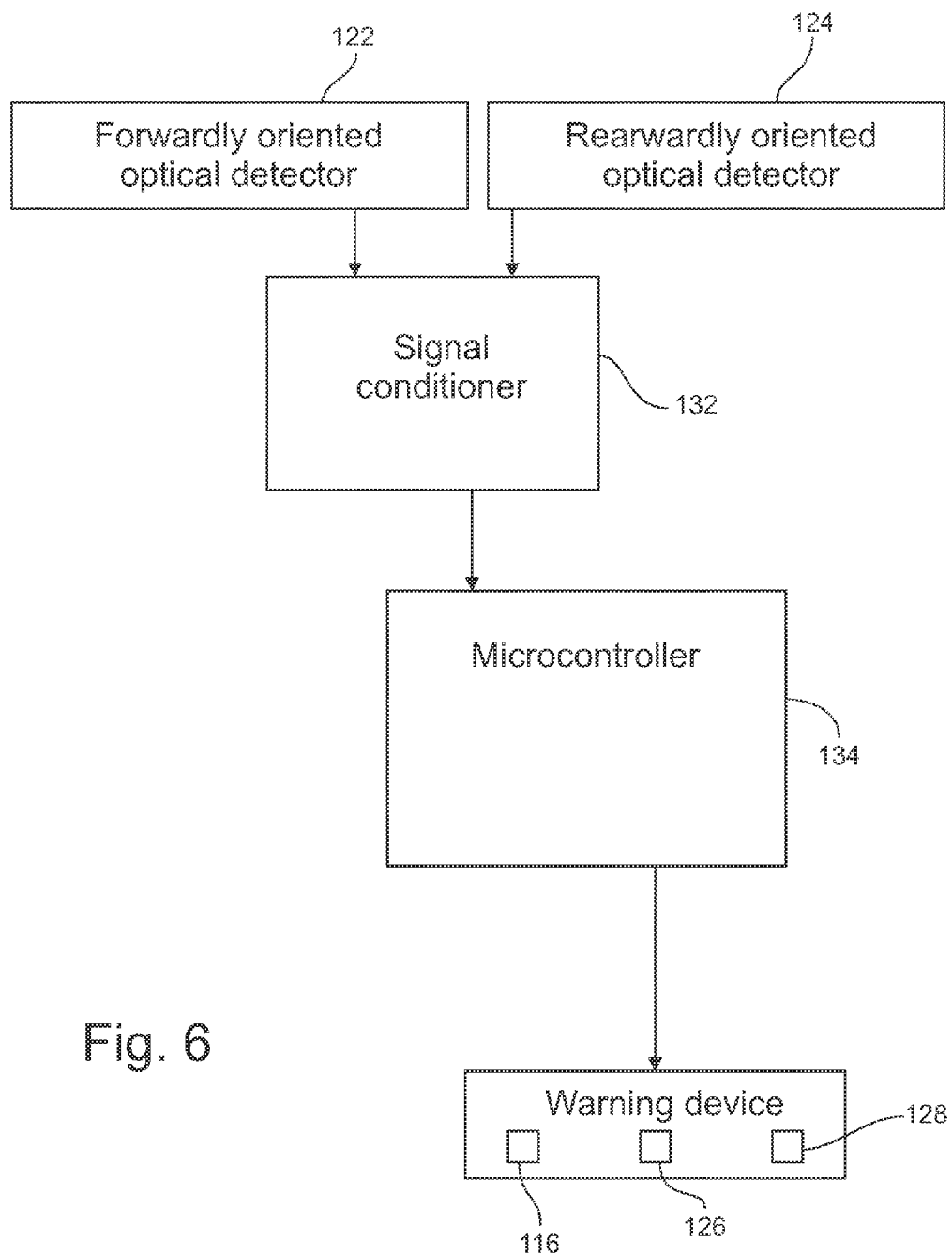
FIG. 6 is a flow chart showing operation of the optical detector apparatus of FIG. 5.

As shown in FIG. 6, optical detector apparatus 14 may have at least one signal conditioner 132 and at least one microcontroller 134 within the six sides of the cube 14. The microcontroller 134 may distinguish between optical signals being emitted from a source forwardly of the car 20 and a source rearwardly of the car 20. For example, an emergency vehicle approaching the car 20 from a rearward position may emit an optical signal at 14 pulses per second and the police car 18 stopped on the shoulder at a location forwardly of the car 20 may emit an optical signal at 17 pulses per second. The microcontroller 134 may be programmed to 1) recognize pulses picked up by the forwardly oriented optical detector 122, 2) count pulses picked up by the forwardly oriented optical detector 122, 3) recognize pulses picked up by the rearwardly oriented optical detector 124 or optical detectors 210, 220, 222, 224, 4) count pulses picked up by the rearwardly oriented optical detector 124 or optical detectors 210, 220, 222, 224, 5) issue a warning through speaker 116, visual display 126 or speaker 128 associated with an optical signal picked up by the forwardly oriented optical detector 122, and 6) issue a warning through speaker 116, visual display 126 or speaker 128 associated with an optical signal picked up by the rearwardly oriented optical detector 124 or optical detectors 210, 220, 222, 224.

As the optical detector apparatus 14 specifically and as to system 10 as a whole, the following U.S. Patents are hereby incorporated by reference: 1) the Nelson U.S. Pat. No. 8,054,200 B1 issued Nov. 8, 2011 and entitled Control Apparatus, Method, And Algorithm For Turning On Warning In Response To Strobe; 2) the Schwartz et al. U.S. Pat. No. 7,952,491 B2 issued May 31, 2011 and entitled Optical Traffic Control System With Burst Mode Light Emitter; 3) the Schwartz et al. U.S. Pat. No. 7,982,631 B2 issued Jul. 19, 2011 and entitled LED Emitter For Optical Traffic Control Systems; and 4) the Hall et al. U.S. Pat. No. 8,072,346 B2 issued Dec. 6, 2011 and entitled LED Light Bar For Optical Traffic Control Systems.

Each of the first optical detectors 122, 166, 170, 172, 174, 176, 178, 180, 182 and second optical detectors 124, 210, 220, 222, 224, may be a photocell, photoresistor, photoconductor, photodetector, phototransistor, or photodiode. One pulse of a strobe light may generate, as a correlated output, one pulse of analog current. This analog signal or analog pulse is then digitized through a signal conditioner 132. A pulse of light or first optical signal 24 from rearwardly oriented emitter 12 may be picked up by the frontwardly oriented optical sensor 122 or other frontwardly oriented optical sensor 166, 170, 172, 174, 176, 178, 180, 182, which then generates a correlated analog pulse, which is then converted to a digital pulse by a signal conditioner and then processed by the microcontroller 134. A pulse of light or second optical signal from a forwardly oriented emitter behind vehicle 20 may be picked up by the rearwardly oriented optical sensor 124, or other optical sensor 210, 220, 222, 224, which then generates a correlated analog pulse, which is then converted to a digital pulse by a signal conditioner and then processed by the microcontroller 134. The light pulse/analog pulse/digital pulse train originating with the first optical emitter 12 forwardly of vehicle 20 may travel on a pathway separate from the light pulse/analog pulse/digital pulse train originating from a second optical emitter on an emergency vehicle behind vehicle 20 (or in a 360 degree horizontal range about vehicle 20) such that the microcontroller 134 can distinguish among optical signals originating from a location forwardly of vehicle 20, a location rearwardly of vehicle 20, a location beyond the driver's side of the vehicle, and a location beyond the front passenger's side of the vehicle.

The first and second light sensors or optical detectors 122, 124 may be oriented 180 degrees opposite of one another. The first and second light sensors or optical detectors 122, 124 may be first and second light sensor portions that are part of the same light sensor. For example, the light sensor may be a cylindrical element having opposite portions that are sensitive to light or that pick up light signals.

When an emergency vehicle comes up behind vehicle 20, the driver of vehicle 20 may not see the emergency vehicle. However, the optical detector 124 picks up the optical signal that the emergency vehicle is employing to preempt the intersection signals and will issue a warning to the driver through speaker 116, visual display 126, or speaker 128, whereupon the driver may move over to the shoulder. However, when the emergency vehicle approaches the vehicle 20 from ahead, the driver is likely to see 1) the emergency vehicle and the flashing lights of the emergency vehicle and 2) cars start to pull over. These are effectively two different warnings and the driver of the vehicle 20 may move his or her vehicle to the shoulder. Thus, in this situation where the emergency vehicle is approaching from a forwardly location, there is less of a need for an optical detector in the vehicle 20 to pick up the optical signal that the emergency vehicle is emitting. Even though there is less of a need in such situation, the frontwardly oriented optical detector 122 can feed into software and circuitry that issues a warning to the driver about an emergency vehicle ahead of its location. In other words, each of the optical detectors 122, 124 need not be tied into a particular optical signal; software and circuitry can be employed. For example, if the rearwardly optical detector 124 picks up an optical code having 17 pulses of light per second (a code that may be reserved a police car making a stop), circuitry or software may ignore this pick up because issuing a warning for an event behind the driver is not likely useful to the driver. The 17 pulses of light may be being emitted by a police car 18 on the opposing portion of the divided highway 26. By way of another example, the rearwardly oriented optical detector 124 may pass on information about emergency vehicles coming up from behind vehicle 20 to the microcontroller 134, which may issue warnings about such. At the same time, the frontwardly oriented optical detector 122 can pass on information about optical signals being emitted by a police car 18 up ahead and by an emergency vehicle approaching from ahead to the microcontroller 134, which may issues warnings about such. Still another example is where emergency vehicles are approaching from behind and from ahead and a police car 18 has stopped up ahead, such as at an accident scene; the optical detector apparatus 14 can issue warnings of the presence of all three vehicles through speaker 116, visual display 126 and speaker 128.

FIG. 7 shows optical emitter 12 mountable on a tripod 136. Tripod 136 includes a set of three legs 138. Each of the legs 138 is telescoping such that the height of a platform 144 (and optical emitter 12) may be raised and lowered by the legs 138. The upper ends of the legs 138 converge at a central location and are engaged to the underside of a disk 140. A central shaft 142 runs vertically through the disk 140 and can be set at various heights relative to the disk 140 to further raise and lower the height of the platform 144. Platform 144 is spaced from an upper end of the shaft 142 by a hub 146 that engages each of the platform 144 and the upper end of the shaft 142. A control stick 148 is engaged to the hub 146. By manipulating the control stick 148, the platform 144 (and optical emitter 12) may spin on the axis of the shaft 142, or the shaft 142 may spin relative to disk 140, or hub 146 may spin relative to shaft 142. By manipulating the control stick 148, the platform 144 (and optical emitter 12) may be made to tilt upwards and downwards relative to the horizon. Platform 144 includes a pin connector 150 that engages the underside of the housing of the optical emitter 12.

Utility or highway worker 58 can thus, through the tripod 136, adjust the height of the optical emitter 12, spin the optical emitter 12 relative to shaft 142 for 360 degrees, and tilt the optical emitter 12 such that first optical signals can be emitted in a direction horizontally relative to the ground, in a direction vertically upwards relative to the ground, in a direction vertically downwards relative to the ground, and in all directions therebetween such that the utility or highway worker 58 can easily aim the optical detector against oncoming traffic and at a location about 2500 feet away, where such distant location may be at an altitude higher or lower than the present altitude of the utility or highway worker 58.

As to the tripod 136, the following U.S. Patents are hereby incorporated by reference: 1) the Ina U.S. Pat. No. 4,174,900 issued Nov. 20, 1979 and entitled Camera Tripod, 2) the Davidson U.S. Pat. No. 4,196,881 issued Apr. 8, 1980 and entitled Camera Tripod, 3) the Grimal U.S. Pat. No. 2,940,708 issued Jun. 14, 1960 and entitled Camera Tripod, and 4) the Weidler U.S. Pat. No. 4,317,552 issued Mar. 2, 1982 and entitled Universal Tripod For Supporting A Camera Or The Like.

It should be noted that the utility worker or highway worker 58 may employ the optical emitter 12 mounted on top of a pole having a sharpened end that may be stuck into the ground.

One invention herein is an optical emitter apparatus that includes a) a tripod, the tripod including three legs, each of the legs having a proximal end and a distal end, the proximal ends confronting each other when the tripod is in a stand alone configuration, the distal ends being spaced apart from each other when the tripod is in the stand alone configuration; b) a pulsing light optical emitter on the tripod when the tripod is in the stand alone configuration; and c) the tripod being configured such that the pulsing light optical emitter can be raised and lowered, tilted relative to the horizon, and spun on a vertical axis such that an optical signal being emitted by the pulsing light optical emitter is directed to a distant location. The pulsing light optical emitter may include an infrared light. The pulsing light optical emitter may emit pulses in a range between 10 and 30 hertz.

FIGS. 8A, 8B, 8C and 8D show an optical detector apparatus 14 housed in a rearview mirror apparatus 152. Rearview mirror apparatus 152 includes a rearview mirror housing component 154 and a socket component 156. Socket component 156 includes a socket for engaging a ball 158 stemming from the rearview mirror housing component 154. Socket component 156 is engaged, such as with glue, to the inside of the windshield. Rearview mirror housing component 154 can be, because of the ball 158, tilted up and down and spun from side to side. Thus, a first face 160 of the rearview mirror housing component 154 is not guaranteed to always be oriented in a rearward fashion. Likewise, a second face 162 of the rearview mirror housing component 154 is not guaranteed to always be oriented in a frontward fashion. To account for the possible manipulations of the first face 160, a rearwardly oriented optical detector 164 is not recessed in a tube such that a face of the optical detector 164 can pick up first optical signals (such as 14 pulses of light per second) from an emergency vehicle approaching vehicle 20 from behind regardless of how the rearview mirror housing component 154 has been twisted or spun relative to the socket component 156. To account for the possible manipulations of the second face 162, a plurality of frontwardly oriented optical detectors 166, 168, 170, 172, 174, 176, 178 and 180 are engaged on the second face 162. These optical detectors 166, 168, 170, 172, 174, 176, 178 and 180 are also not recessed in a tube such that a face of the optical detector can pick up first optical signals (such as 17 pulses of light per second) from police car 18 at a location forwardly of the vehicle 20. A stationary optical detector 182 can be engaged to the socket component 156 and aimed directly forwardly. The stationary optical detector 182 can be disposed between the socket component 156 and the windshield or the stationary optical detector 182 can be engaged on the upper, lower, right, or left edge of the socket component 156. Electrical leads can extend from the stationary optical detector 182 to the rearview mirror housing 154.

Optical detector apparatus 14 in the form of the rearview mirror apparatus 152 includes a front speaker 184, a top speaker 186 and a bottom speaker 188 to issue audio warnings corresponding to first optical signals picked up by the optical detectors 164, 166, 168, 170, 172, 174, 176, 178, 180, 182.

Optical detector apparatus 14 in the form of the rearview mirror apparatus 152 includes a visual display 190 to issue visual warnings corresponding to optical signals picked up by optical detectors 164, 166, 168, 170, 172, 174, 176, 178, 180, 182. The visual display 190 is an electronic or digital display in the mirror 192 of the rearview mirror housing 154. As to such, the following U.S. Patents are hereby incorporated by reference: 1) the Northman et al. U.S. Pat. No. 6,572,233 B1 issued Jun. 3, 2003 and entitled Rearview Mirror With Display; and 2) the Marcus et al. U.S. Pat. No. 6,124,647 issued Sep. 26, 2000 and entitled Information Display In A Rearview Mirror. Or the visual display can be separate from the mirror and in the nature of the visual display 126.

As with the optical detector apparatus 14 shown in FIG. 5, rearview mirror apparatus 152 includes a button 194 functioning as an on/off switch. Warnings issued by the speakers 184, 186, 188 and visual display 190 may become monotonous and irritating, and button 194 may be employed to turn off the warning devices. However, a time delay function may be built in such that, after a period of time, the optical detector apparatus 14 housed in the rearview mirror apparatus 152 will become active again and ready to pick up and issue further warnings. Another button 196 may control the language of the phrases displayed by the visual display 190. Optical detector apparatus 14 housed in the rearview mirror apparatus 152 may be continually on, or may be on only when the car 20 is turned on, and button 194 may turn off one or all of the warning devices 184, 186, 188, and 190 for a period of time after the optical detector apparatus 14 generates an alarm and emits a sound or warning through one of the warning devices 184, 186, 188, and 190. The rearview mirror apparatus 152 includes further button switches, namely, button switch 198 for increasing volume of the speakers 184, 186, 188 and button switch 200 for decreasing the volume of these speakers, and button switch 202 for turning off the visual display 190 only.

The steps of the flow chart of FIG. 6 also apply to the optical detector apparatus 14 housed in the rearview mirror apparatus 152 of FIG. 6, such that the mirror housing 154 can contain one or more signal conditioners and a microcontroller, as well as a power source and other electronic circuitry. Optical detector apparatus 14 may be housed in a cube form as shown in FIG. 5 or may be housed in a rearview mirror form as shown in FIGS. 8A, 8B, 8C and 8D. Rearview mirror apparatus 152 offers a direct line of sight forwardly of the vehicle 20 for pick up of first optical signals emitted rearwardly by police car 18 forwardly of vehicle 20. Rearview mirror apparatus 152 offers a direct line of sight rearwardly of the vehicle for pick up by optical detector 164 of second optical signals emitted forwardly by an emergency vehicle approaching the vehicle 20 from behind.

In operation, vehicle 22 may be exceeding the speed limit on roadway 28. A police officer in police car 18 may pursue and stop the vehicle 22. The vehicle 22 may stop on the shoulder 36. The police officer may stop his or her police car 18 half on the shoulder 36 and half in lane 32. The police officer may place the police car 18 in park (thereby closing switches 98 and 100), set the parking brake 88 (thereby closing switch 96), get off seat 91 (thereby closing switch 102) and open the driver's door 66 (thereby closing switch 94). The system 10 may be programmed to emit first optical signal 24 (having 17 pulses per second, for example) when any one, or any number, or all of switches 98, 100, 96, 102, and 94 close. Or system 10 may be programmed to emit first optical signal 24 only when the manual switch 92 is closed, an action that the police officer may make when he or she stops the police car 18. Then the police officer may walk to the vehicle 22. Then the police officer may return to the police car 18 to write up a ticket. Preferably, since a preprogrammed time to cease operation of optical emitter 12 has not yet expired, the optical emitter 12 continues to emit the first optical signal 24. The return of the police officer to his or her vehicle, including the opening and closing of driver's door 66 and a sitting in the driver's seat 91, may have no effect on the optical emitter 12, which continues to emit the first optical emitter 12. The police car 18 is still in park and the parking brake 88 is still set. Then the police office returns to the vehicle 22 with the ticket, again getting out of the police car 18, an action that may have no effect on the optical emitter 12, which continues to emit the first optical signal 24. Then, after giving the driver of vehicle 22 his or her ticket, the police officer returns to police car 18, closes the driver's door 66, sits in seat 91, takes off the parking brake 88, takes the selector lever of the selector lever unit 96 out of park to engage the transmission in a position other than park; this sequence of events may not turn off optical emitter 12 because the police officer's vehicle 18 may still be at a relatively dangerous position in lane 32. The system 10 may cease operation of the optical emitter 12 only after the police officer's vehicle 18 is back up to normal highway speed, whereupon internal transmission switch 100 may turn off the optical emitter 12.

Almost at the same time that the optical emitter 12 is turned on, the optical detector apparatus 14 will issue a warning to the driver of vehicle 20. Forwardly oriented optical detector 122 picks up the first optical signal 24 (such as 17 pulses of light per second) and will generate a corresponding analog pulse, which will be transformed by the signal conditioner 132 into a digital pulse, which will be processed by the microcontroller 134, which will issue the appropriate warning through one or more of the speaker 116, visual display 126, and speaker 128, to the driver of vehicle 20. The driver of vehicle 20 thus can take appropriate measures such as beginning to merge from lane 32 into lane 30. The driver of vehicle 20 is then continually warned by the optical detector apparatus 14, even when the driver of vehicle 20 drives forwardly and out of the cone of transmission of first optical signal 24. At such time, the driver is likely relatively close to the police car 18 and can see the police car 18 and the situation involving the pulled over vehicle 22. While the optical detector apparatus 14 can be programmed to turn off the warning devices 116, 126 and 128 when the vehicle 20 drives out of the cone of transmission of the first optical signal 24, it is preferable that the turning off of the warning devices 116, 126, 128 is controlled by a timer. For example, the driver of vehicle 20 may receive his or first warning of the situation up ahead when the driver is about 2500 feet from the situation. At 60 miles per hour, it may take the driver about 30 seconds to reach the situation. Thus, programming a timer to cease operation of the warnings issued by the optical detector apparatus 14 after about 60 seconds is not considered to be monotonous or irritating, though optical detector apparatus 14 may be preprogrammed to permit the button 130 to turn off the warning devices 116, 126 and 128 prior to the expiration of the 60 second timer.

In the operation of the tripod mounted optical emitter 12 shown in FIG. 7, the utility worker or highway worker 58 sets up the tripod 136 in the shoulder 36 of the road or off the shoulder 36 of the road. Then the utility worker or highway worker raises or lowers the tripod 136 or keeps the tripod 136 at the preadjusted height, tilts the optical emitter 12 upwardly or downwardly or keeps the optical emitter 12 aimed horizontally, and spins or does not spin the optical emitter 12; these manipulations of the tripod 136 aim the optical emitter 12 at a location about 2500 feet away so as to give the oncoming vehicles 20 a maximum amount of time to be warned of the situation ahead. Then the utility worker or highway worker activates the tripod mounted optical emitter 12 to emit the first optical signal 24.

It should be noted that the optical detector apparatus 14 found in both the embodiment of FIG. 5 and the embodiment of FIGS. 8A, 8B, 8C and 8D have a number of features. These features need not be housed in the same structure, such as in one cubed structure or one rearview mirror housing. Instead, the features may be housed at separate locations in vehicle 20 and communicate with each other by electrical leads or by a wireless mode of communication. For example, the speakers of the optical detector apparatus may be the speakers of the radio or audio system of the car as a whole. The optical detectors may be placed inside or outside the car. The visual display may be an electronic portion of the windshield directly in front of the driver. The buttons or button switches may be on the instrument panel of the vehicle 20. The microcontroller can be part of a larger microcontroller housed somewhere in the vehicle 20. In other words, the optical detector apparatus 14 does not require housing in a black box.

Figure 8A:
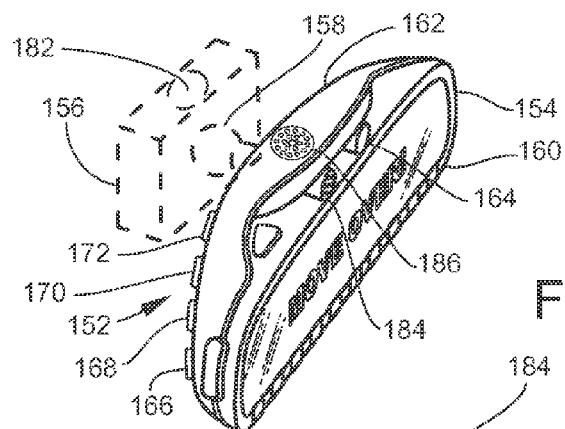
FIG. 8A is a perspective view of an optical detector apparatus in an internal rearview mirror.

As indicated above, FIG. 9A is a front view of the optical detector apparatus of FIG. 8A having a cylindrically shaped optical detector 210 that picks up optical signals over a horizontal range of 360 degrees and FIG. 9B is a perspective view of the optical detector of FIG. 5 having a cylindrically shaped optical detector 210 that picks up optical signals over a horizontal range of 360 degrees. Each of the optical detectors 210 is mounted on a post 212, which post 212 is engaged to either the rearview mirror 152 or to optical detector housing 14. Each of the optical detectors 210 includes a cylindrically shaped generally vertical photosensitive surface 214. The photosensitive surface 214 detects first or second optical signals originating over a horizontal range of 360 degrees. In other words, if the optical detector 210 was the center of a wheel, spokes of the wheel radiate out from the center in a horizontal plane, where the plane is disposed at a right angle to the post 212. These spokes may radiate out frontwardly, or rearwardly, or to the passenger's side, or to the driver's side, or to any position between two adjacent positions of the four positions. These spokes represent first or second optical signals or photons streaming in from an optical emitter, such as rearwardly oriented optical emitter 12 sending first optical signals (such as mounted on active but not moving police car 18), or frontwardly oriented optical emitter 78 sending second optical signals (mounted on an active and moving emergency vehicle), wherever these optical emitters 12, 78 are positioned with respect to the rearview mirror 152 or optical detector housing 14 having the optical detector 210.

An optical signal, such as a first or second optical signal, received by the optical detector 210 may carry a great variety and great amount of information, including the absolute (GPS) location of the optical emitter (such as optical emitter 12, 78) and therefore the absolute location of the emergency vehicle having such optical emitter. A microcontroller or computer in or in communication with the rearview mirror 152 (having its own GPS) or optical detector housing 14 (having its own GPS) may then advise the driver of the vehicle having the rearview mirror 152 or optical detector housing 14 of the location of the emergency vehicle. This type of method bypasses a central computer housed, for example, at a government transit facility where information is collected, processed, and then retransmitted to civilian and government vehicles. GPS means global positioning system.

In other words, optical detector 210 may bypass the need for optical detectors that are oriented forwardly (to capture first optical signals generated by rearwardly oriented optical emitters) and that are oriented rearwardly (to capture second optical signals generated by frontwardly oriented optical emitters). However, unlike the optical detectors of FIGS. 5 and 8A, 8B, 8C and 8D, optical detector 210 in the above method may require coordination with a global positioning system that provides the absolute location of civilian vehicle 20 such that the GPS location of the vehicle 20 may be compared to the GPS location of the emergency vehicle or police car 18.

It should be noted that optical signals are not limited to merely 14 pulses of light per second (an example of a second optical signal) or 17 pulses of light per second (an example of a first optical signal). Optical signals may carry a great amount of information, including the absolute location of the optical emitter (and thus the absolute location of the vehicle having the optical emitter), the direction of travel of the vehicle having the optical emitter, the type of vehicle having the optical emitter, and the speed of the vehicle having the optical emitter.

The preferred application of optical detector 210 is greatly more simple than the GPS type of method described above. In the preferred application of optical detector 210, optical detector 210: a) receives second optical signals (such as 14 pulses of light per second) from emergency vehicles that are both moving and active, wherever such moving and active emergency vehicles are (i.e., forwardly, rearwardly, to the passenger's side, to the driver's side, or at an angle between two positions of these four positions), and b) ignores first optical signals (such as 17 pulses of light per second) from active but non-moving emergency vehicles such as police car 18. The optical detector 210 may if desired receive first optical signals from active emergency vehicles that are not moving, such as police car 18, but the management of the software controlling optical detector 210 may have an option to ignore such first optical signals from active emergency vehicles that are not moving. While optical detector 210 thus picks up or recognizes second optical signals from emergency vehicles (that are both moving and active located) anywhere in a 360 degree horizontal range about optical detector 210, optical detectors 166, 168, 170, 172, 174, 176, 178, 180, 182 (on rear view mirror 152) and optical detector 122 (on apparatus 14) pick up first optical signals from stopped emergency vehicles (such as police car 18) originating generally forwardly of vehicle 20. The microcontroller or computer or central processing unit of the apparatus 14 or rearview mirror 152 issues a "move over" suggestion (or similar warning or concept) to a civilian in a civilian vehicle in response to optical signals detected by optical detectors 122, 166, 168, 170, 172, 174, 176, 178, 180, 182 and approved by the microcontroller or computer. The microcontroller or computer or central processing unit of the apparatus 14 or rearview mirror 152 issues an "emergency vehicle approaching" warning (or similar warning or concept) to a civilian in a civilian vehicle in response to second optical signals detected by optical detector 210 (and/or optical detectors 124, 220, 222, and 224 and approved by the microcontroller or computer.

It should be noted that apparatus 14 may have an optical detector 220 mounted on a left side surface for detecting second optical signals originating from the driver's side of the vehicle 20, an optical detector 222 mounted on front side surface for detecting second optical signals originating from a position forwardly of vehicle 20, and an optical detector 224 mounted on a right side surface for detecting second optical signals originating from the front passenger's side of the vehicle 20, as well as optical detector 124 mounted on a back side of apparatus 14. Optical detectors 124, 220, 222, and 224 may be used with or without optical detector 210 having cylindrical surface 212.

Figure 8B:
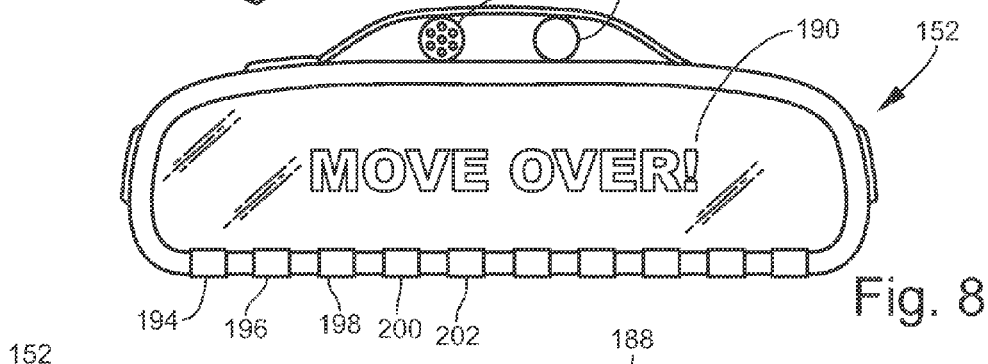
FIG. 8B is a front view of the optical detector apparatus of FIG. 8A.
Figure 8C:
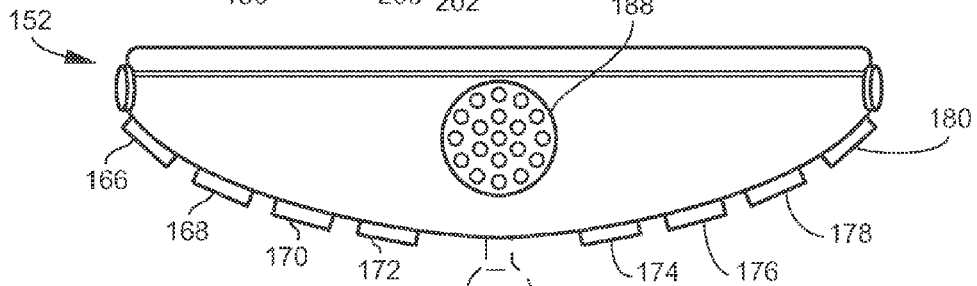
FIG. 8C is a bottom view of the optical detector apparatus of FIG. 8A.
Figure 8D:
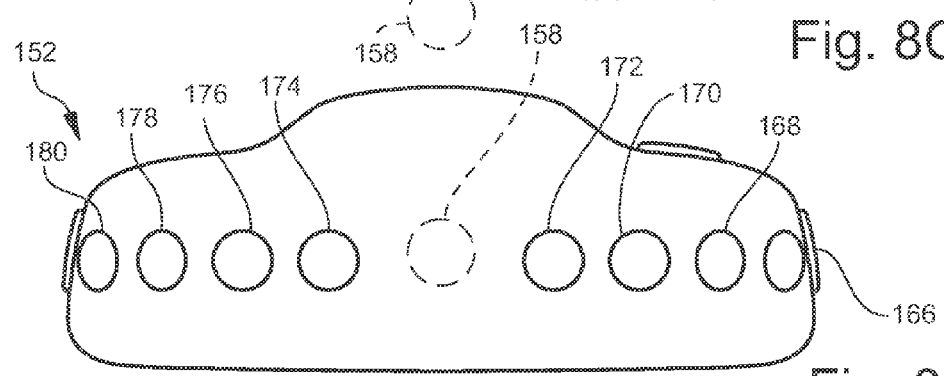
FIG. 8D is a rear view of the optical detector apparatus of FIG. 8A.

It should be noted that the electronic structure generating the "move over" sign in FIG. 9A takes up less space in FIG. 9A than in FIG. 8B. In FIG. 9A, the "move over" sign is contained within an area between a left edge of the rear view mirror 152 and a vertical midpoint line of the mirror of the rear view mirror 152. In FIG. 9A, the "move over" sign is contained further within an area between the bottom edge of the rear view mirror 152 and a horizontal midpoint line of the mirror of the rear view mirror 152.

INCORPORATION BY REFERENCE

As to the system 10 and its various features, such as to the various means and methods employed for communicating information from optical detector 12 to optical detector apparatus 14, this application incorporates by reference in their entireties the following U.S. Patents, U.S. Patent Application Publications, and U.S. Patent Applications: 1) the McKenna U.S. Pat. No. 5,495,243 issued Feb. 27, 1996 and entitled Emergency Vehicle Alarm System For Vehicles; 2) the Henry et al. U.S. Pat. No. 6,094,148 issued Jul. 25, 2000 and entitled Vehicular Emergency Vehicle Alarm Apparatus; 3) the McKenna U.S. Pat. No. 6,252,519 issued Jun. 26, 2001 and entitled Emergency Vehicle Signaling System; 4) the McKenna U.S. Pat. No. 7,446,674 Issued Nov. 4, 2008 and Entitled Emergency Warning System For Approach Of Right Of Way Vehicle; 5) the McKenna U.S. Patent Application Publication Number 2006/0255966 A1 published Nov. 16, 2006 and entitled Emergency Warning System For Approach Of Right Of Way Vehicle; 6) the McKenna U.S. Patent Application Publication Number 2007/0046499 A1 published Mar. 1, 2007 and entitled Emergency Warning System For Approach Of Right Of Way Vehicle; 7) the McKenna U.S. Patent Application Publication Number 2009/0174571 published Jul. 9, 2009 and entitled Navigation Apparatus Having Emergency Warning System; and 8) the Hamer U.S. Pat. No. 5,172,113 issued Dec. 15, 1992 and entitled System And Method For Transmitting Data In An Optical Traffic Preemption System; 9) the Hamer U.S. Pat. No. 5,187,476 issued Feb. 16, 1993 and entitled Optical Traffic Preemption Detector Circuitry; 10) the Hamer et al. U.S. Pat. No. 5,202,683 issued Apr. 13, 1993 and entitled Optical Traffic Preemption Detector; 11) the Haagenstad et al. U.S. Pat. No. 5,602,739 issued Feb. 11, 1997 and entitled Vehicle Tracking System Incorporating Traffic Signal Preemption; 12) the Johnson U.S. Pat. No. 8,325,062 B2 issued Dec. 4, 2012 and entitled Centralized Management Of Preemption Control Of Traffic Management; 13) the Johnson U.S. Pat. No. 8,344,908 B2 issued Jan. 1, 2013 and entitled Monitoring Management And Presentation Of Preemption Control Data Of Centrally Managed Traffic Signals; 14) the Schwartz U.S. Pat. No. 7,307,547 B2 issued Dec. 11, 2007 and entitled Traffic Preemption System Signal Validation Method; 15) the Schwartz U.S. Pat. No. 7,333,028 B2 issued Feb. 19, 2008 and entitled Traffic Preemption System Communication Method; 16) the Schwartz U.S. Pat. No. 7,417,560 B2 issued Aug. 26, 2008 and entitled Multimode Traffic Priority/Preemption Intersection Arrangement; 17) the Schwartz U.S. Pat. No. 7,432,826 B2 issued Oct. 7, 2008 and entitled Traffic Preemption System With Headway Management; 18) the Schwartz U.S. Pat. No. 7,515,064 B2 issued Apr. 7, 2009 and entitled Remote Activation Of A Vehicle Priority System; 19) the Schwartz U.S. Pat. No. 7,573,399 B2 issued Aug. 11, 2009 and entitled Multimode Traffic Priority/Preemption Vehicle Arrangement; 20) the Schwartz et al. U.S. Pat. No. 7,982,631 B2 issued Jul. 19, 2011 and entitled LED Emitter For Optical Traffic Control Systems; 21) the Hall et al. U.S. Pat. No. 8,072,346 B2 issued Dec. 6, 2011 and entitled LED Light Bar For Optical Traffic Control Systems; 22) the Schwartz et al. U.S. Pat. No. 7,952,491 B2 issued May 31, 2011 and entitled Optical Traffic Control System With Burst Mode Light Emitter; 23) the Edwardson U.S. Pat. No. 8,487,780 B2 issued Jul. 16, 2013 and entitled Defining Approach Maps For Traffic Signal Preemption Controllers; and 24) the Johnson U.S. Pat. No. 8,610,596 B2 issued Dec. 17, 2013 and entitled Monitoring And Diagnostics Of Traffic Signal Preemption Controllers.

Optical emitter 12 may be employed in the present invention in a number of ways. A first way is when an emergency vehicle 18 comes up behind a vehicle 20, where for example the driver of the vehicle 20 does not see the emergency vehicle 18. This emergency vehicle 18 may have, according to the present invention, an optical emitter 12 that projects light forwardly. This optical emitter 12 may be on a light bar mounted on the emergency vehicle. A second way is when the emergency vehicle 18 is ahead of the vehicle 20 and when the driver may or may not see the emergency vehicle 18. In this second way, the emergency vehicle 18, according to the present invention, may have optical emitter 12 and project light rearwardly. Here too the optical emitter 12 may be on a light bar. A third way is where the optical emitter 12 is mounted on tripod 136 and may protect utility or highway workers 58. In this third way, the workers 58 may project the optical emitter 12 against the flow of traffic (in the direction of oncoming traffic). Or the optical emitter 12 that the highway or utility workers are employing may be on a light bar on a utility truck. In any of these three ways of employing the optical emitter 12 and optical detector apparatus 14, civilian vehicle 20 may have therein the optical detector apparatus 14.

As to the above three ways of employing the optical emitter 12 and optical detector apparatus 14 and other ways disclosed herein, the Schwartz U.S. Pat. No. 7,333,028 B2 issued Feb. 19, 2008 and entitled Traffic Preemption System Communication Method is incorporated by reference to, for example, teach the features of FIGS. 10A, 10B, 10C, 11A and 11B described below.

As to the above three ways of employing the optical emitter 12 and optical detector apparatus 14 and other ways disclosed herein, the Hall et al. U.S. Pat. No. 8,072,346 B2 issued Dec. 6, 2011 and entitled LED Light Bar For Optical Traffic Control Systems is incorporated by reference to, for example, teach the features of FIG. 12 described below.

As to the above three ways of employing the optical emitter 12 and optical detector apparatus 14 and other ways disclosed herein, the Schwartz U.S. Pat. No. 7,307,547 B2 issued Dec. 11, 2007 and entitled Traffic Preemption System Signal Validation Method is incorporated by reference to, for example, teach the features of FIG. 13 described below.

As to the above three ways of employing the optical emitter 12 and optical detector apparatus 14 and other ways disclosed herein, the Schwartz U.S. Pat. No. 7,573,399 B2 issued Aug. 11, 2009 and entitled Multimode Traffic Priority/Preemption Vehicle Arrangement is incorporated by reference to, for example, teach the features of FIG. 14 described below.

Figures 10A, 10B, 10C:
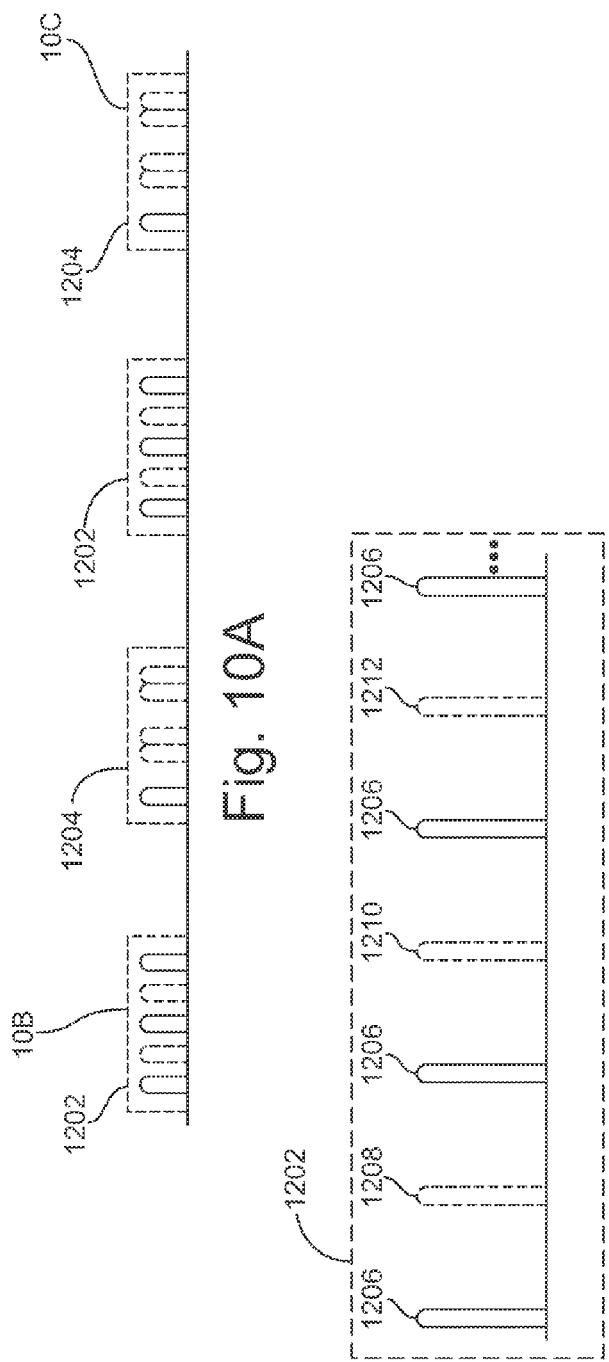

FIGS. 10A, 10B, 10C, 11A and 11B illustrate optical pulses transmitted from optical emitter 12 to optical detector apparatus 14 for a communication protocol in accordance with the present invention. As illustrated in FIG. 10A, optical pulse stream 1200 can alternate between a set 1202 of light pulses using amplitude modulation and a set of light pulses 1204 using frequency modulation. An example for each of sets 1202 and 1204 is illustrated in FIGS. 10B and 10C, enlarged to show detail.

As shown in FIG. 10B, set 1202 of optical pulse stream 1200 has major stroboscopic pulses of light 1206 occurring at a particular frequency that typically is nominally either 10 Hz or 14 Hz. Between the major pulses, optional data pulses 1208, 1210, and 1212 embed the encoded data words in the set 1202 of optical pulse stream 1200.

For example, if pulse 1208 is present then an encoded data word has a first bit of one, and if pulse 1208 is absent then the encoded data word has a first bit of zero. The value of a first bit of the encoded data word determines the amplitude modulation of either a full level for pulse 1208 or a zero level for pulse 1208. If pulse 1210 is present then the encoded data word has a second bit of one, and if pulse 1210 is absent then the encoded data word has a second bit of zero. Similarly, if pulse 1212 is present then the encoded data word has a third bit of one, and if pulse 1212 is absent then the encoded data word has a third bit of zero. Typically, the optional pulses 1208, 1210, and 1212 are half-way between the major pulses 1206. Another optical pulse stream that only includes sets of pulses 1202 may correspond to the communication protocol of an Opticom™ Priority Control System.

As shown in FIG. 10C, set 1204 of optical pulse stream 1200 has stroboscopic pulses of light that nominally occur at a particular frequency that typically is approximately either 10 Hz or 14 Hz, but the pulses are displaced from the nominal frequency to embed the encoded data words in the optical pulse stream 1200. For example, after an initial pulse 1214, only one or the other of pulses 1216 and 1218 is present and if an early pulse 1216 is present then an encoded data word has a first bit of zero and if late pulse 1218 is present then the encoded data word has a first bit of one. The value of a first bit of the encoded data word determines the frequency modulation of either an early pulse 1216 or a late pulse 1218. Only one or the other of pulses 1220 and 1222 is present and if early pulse 1220 is present then the encoded data word has a second bit of zero and if late pulse 1222 is present then the encoded data word has a second bit of one. Similarly, only one or the other of pulses 1224 and 1226 is present and if early pulse 1224 is present then the encoded data word has a third bit of zero and if late pulse 1226 is present then the encoded data word has a third bit of one.

Typically, each pulse 1216 through 1226 is separated from the prior pulse with a nominal time period corresponding to the nominal frequency with the actual separation between a pulse and the prior pulse providing frequency modulation by being slightly less or slightly more than the nominal time period. An early pulse with a separation from the prior pulse of slightly less than the nominal time period embeds a data bit of zero and a late pulse with a separation from the prior pulse of slightly more than the nominal time period embeds a data bit of one. For example, if pulse 1216 is present then a second bit of zero is embedded when pulse 1220 is separated from pulse 1216 by slightly less than the nominal time period, and if pulse 1218 is present then a second bit of zero is embedded when pulse 1220 is separated from pulse 1218 by slightly less than the nominal time period. Another optical pulse stream that only includes sets of pulses 1204 may correspond to the communication protocol of a system such as a Strobecom II system.

Optical pulse stream 1240 of FIG. 11A has major stroboscopic pulses of light 1242 occurring at a particular frequency that typically is nominally either 10 Hz or 14 Hz. Between the major pulses, optional data pulses 1244 through 1260 embed the encoded data words. Optical pulse stream 1240 encodes two bits of the encoded data between each major light pulse 1242. Optical pulse stream 1240 permits more encoded data or duplicated encoded data to be transmitted within a given time interval as compared to an optical pulse stream that encodes only one bit of data between each major pulse. For example, optical pulse stream 1240 may double the number of bits for encoded data from 14-bits to 28-bits, correspondingly increasing the number of possible identification codes from 16,384 possible codes to over 268 million possible codes, where such an identification code is from optical emitter 12 to optical detector apparatus 14 and where such a code may communicate one or more of 1) how far the optical emitter 12 (emergency vehicle 18 or tripod 136) is from the vehicle 20 (having the optical detector apparatus 14), 2) the type of emergency vehicle 18—whether a police car, fire truck, ambulance, etc., 3) when the emergency vehicle 18 will be adjacent to the vehicle 20, 4) the speed the emergency vehicle 18 is traveling, 5) whether the vehicle 20 should move over right or left, 6) whether the vehicle 20 should move over immediately or at another time, 7) the name of the street the emergency vehicle 18 is traveling upon, and 8) the destination of the emergency vehicle 18. These are examples of just a handful of identification codes or communications that may be made.

The present first responders' roadway priority system between an optical emitter 12 and an optical detector apparatus 14 may be configured with 1000 authorized vehicle identification codes or 1000 different pieces of information. However, an unauthorized user may be readily able to "guess" identification codes or pieces of information when 1000 of 16,384 possible codes or pieces of information are utilized or authorized. However, guessing the identification code or piece of information is unlikely when 1000 of 268-million possible codes or pieces of information are authorized or utilized identification codes and the present system of FIGS. 10A, 10B, 10C, 11A and 11B can generate 268 million possible identification codes or pieces of information from the optical emitter 12 to the optical detector apparatus 14.

Optical pulse stream 1240 can encode the first and second bits in data pulses 1244, 1246 and 1248. The combination of the first and second bits has four possible values and pulses 1244, 1246 and 1248 have four corresponding data pulse combinations. In a first combination, all pulses 1244, 1246 and 1248 are absent. In a second combination, pulse 1244 is present and pulses 1246 and 1248 are absent. In a third combination, pulse 1246 is present and pulses 1244 and 1248 are absent. In a fourth combination, pulse 1248 is present and pulses 1244 and 1246 are absent.

Optical pulse stream 1240 may be generated by an optical emitter having a Xenon flash tube. The Xenon flash tube can emit an optical pulse by converting energy stored in a capacitor into a flash of light. Generally, the power supply for the Xenon flash tube takes some time to recharge the capacitor for the next flash of light. Thus, the time between optical pulses generally should exceed a value corresponding a capacitor recharge time. Typically, positions for optical pulses 1244, 1246 and 1248 are separated by a time period that permits at most one of the optical pulses to be emitted.

Thus, the absence of any of the optical pulses 1244, 1246 and 1248 or a pulse that is one of optical pulses 1244, 1246 and 1248 can correspond to the amplitude modulation and/or frequency modulation of an optical pulse that is nominally in the pulse position for optical pulse 246. The absence of pulses 1244, 1246 and 1248 can correspond to an amplitude modulation of zero amplitude and unknown frequency modulation. The presence of only optical pulse 1246 can correspond to an amplitude modulation of full amplitude and a frequency modulation of zero shifting. The presence of only optical pulse 1244 can correspond to an amplitude modulation of full amplitude and a frequency modulation of early shifting. The presence of only optical pulse 1248 can correspond to an amplitude modulation of full amplitude and a frequency modulation of late shifting.

Optical pulse stream 1270 of FIG. 11B combines pulse positions of sets 1202 and 1204 of optical pulse stream 1200 from FIG. 10A, allowing more encoded data or duplicated encoded data to be transmitted within a given time interval. After an emitter transmits an initial pulse 1272, the presence or absence of pulse 1274 respectively provides a first bit of one or zero, and the presence of either of mutually exclusive pulses 1276 or pulse 1278 provides a second bit of zero or one. Optical pulses 1274, 1280, and 1286 have respective amplitude modulation of either full amplitude or zero amplitude and optical pulses 1276 or 1278, 1282 or 1284, and 1288 or 1290 have frequency modulation of either early or late shifting. Additional bits three through six are similarly embedded by pulses 1280 through 1290.

In one embodiment, pulses 1274, 1280, and 1286 are transmitted by an emitter one-half of the nominal period after the previous pulse. For example, if pulse 1276 is present then pulse 1280 is transmitted one-half of the nominal period after pulse 1276 and if pulse 1278 is present then pulse 1280 is transmitted one-half of the nominal period after pulse 1278. In another embodiment, pulses 1274, 1280, and 1286 are transmitted half-way between the previous and following pulses.

The nominal frequency used to transmit pulses of an optical pulse stream 1200, 1240, and 1270 can be employed for communication between optical emitter 12 and optical detector apparatus 14. For example, a frequency of approximately 14 Hz can correspond to the identification of an emergency vehicle 18 (that an emergency vehicle 18 having optical emitter 12 is approaching a vehicle 20 having an optical detector apparatus 14) and a frequency of approximately 10 Hz can correspond to the identification of a mass transit vehicle (that a mass transit vehicle having optical emitter 12 is approaching a vehicle 20 having optical detector apparatus 14).

Figure 12:
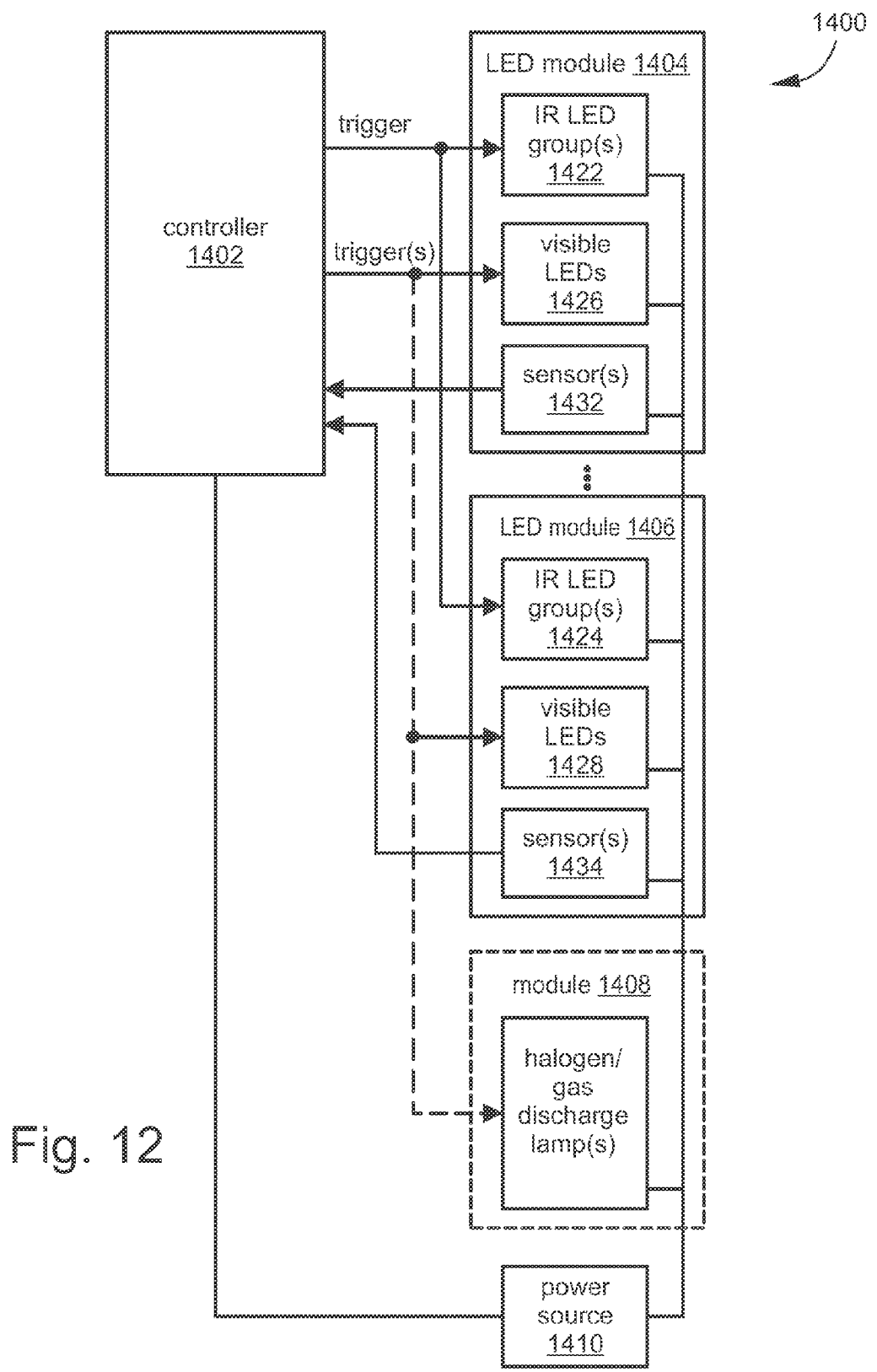
FIG. 12 is a functional block diagram of an emergency lighting arrangement for, by way of example, a light bar with one or more optical emitters of an emergency vehicle for transmitting light signals to an optical detector apparatus of a civilian vehicle for communication between the emergency vehicle and civilian vehicle.

FIG. 12 is a functional block diagram of an emergency lighting arrangement or light bar 1400 where the light bar may be on the emergency vehicle 18 and where the light bar 1400 is transmitting optical signals to the optical detector apparatus 14 in a vehicle 20. The lighting arrangement 1400 includes a controller 1402 and two or more LED modules 1404 and 1406. A light module 1408 for a halogen or gas discharge lamp may be included in this embodiment or another embodiment. The power source 1410 provides power to the controller and light modules 1404, 1406, and 1408.

The LED modules 1404 and 1406 include one or more groups 1422 and 1424 of IR LEDs and one or more groups of visible LEDs 1426 and 1428. Each LED module also includes a sensor 1432 and 1434, respectively, for sensing operating conditions and providing feedback to the controller.

The control of the IR LEDs may be either integrated/combined with the control of the visible LEDs or provided by a separate controller. The controller 1402 triggers the visible LEDs for emitting flash patterns for purposes of warning those in proximity of the presence or approach of an emergency vehicle 18. The IR LEDs can be triggered for emitting a pulse pattern for communication between optical emitter 12 and optical detector apparatus 14. The light module 1408 may be triggered with the visible LEDs or under separate control.

The sensors 1432 and 1434 provide feedback to the controller so that the controller can operate the IR LED groups in a manner that maintains a desired level of IR radiant power. The sensors 1432 and 1434 sense the operating conditions of the IR LED groups and provide feedback data to the controller, which may in response thereto, adjust the pulse amplitude and pulse width of the trigger signal to the IR LED groups. Each LED module may include multiple sensors for sensing temperature, emitted radiant power from the IR LED groups, and/or current sensing, for example. If any of these sensed levels indicates a drop in emitted radiant power from one of the LED modules, the controller can adjust the pulse amplitude and pulse width to one or more of the IR LED groups to compensate.

The features of the lighting arrangement or light bar of FIG. 12 may be utilized to send optical signals in accordance with the system of FIGS. 10A, 10B, 10C, 11A, and 11B.

Figure 13:
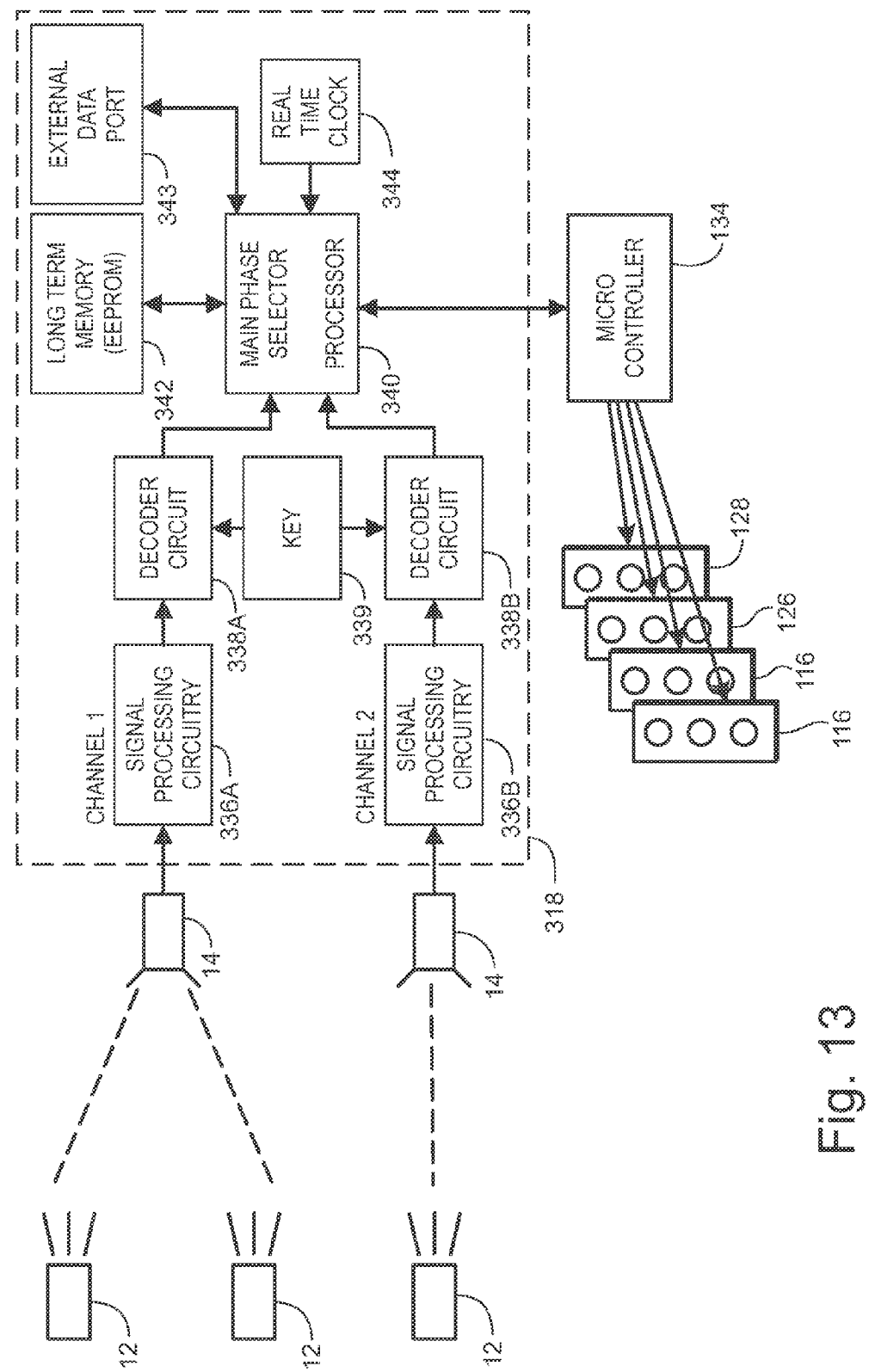
FIG. 13 is a block diagram of the components of an optical signaling system having one or more optical emitters on one or more emergency vehicles and one or more optical detector apparatus on one or more civilian vehicles for communication between the emergency vehicles and the civilian vehicles.

FIG. 13 is a block diagram. In FIG. 13, light pulses originating from the optical emitters 12 are received by the detector assembly 14, which is connected to a channel one of the phase selector 318. Light pulses originating from the optical emitter 12 are received by the detector assembly 14, which is connected to a channel two of the phase selector 318.

The phase selector 318 includes the two channels, with each channel having signal processing circuitry (336A and 336B) and a decoder circuit (338A and 338B), a main phase selector processor 340, long term memory 342, an external data port 343 and a real time clock 344. The main phase selector processor 340 communicates with the microcontroller 134, which in turn controls the warning devices 116, 126, 128.

With reference to the channel one, the signal processing circuitry 336A receives an analog signal provided by the detector assembly 14. The signal processing circuitry 336A processes the analog signal and produces a digital signal that is received by the decoder circuit 338A. The decoder circuit 338A extracts data from the digital signal, validates proper authorization and provides the data to the main phase selector processor 340. Channel two is similarly configured, with the detector assembly 14 coupled to the signal processing circuitry 336B, which in turn is coupled to the decoder circuit 338B.

The long term memory 342 is implemented using electronically erasable programmable read only memory (EEPROM). The long term memory 342 is coupled to the main phase selector processor 340 and is used to store a list of authorized identification codes and to log data. It will be appreciated that keys 339 can be stored in long term memory 342.

The decoder circuits 338A and 338B use keys 339 to check for proper authorization. In one embodiment, a received vehicle identification code is decrypted using the decryption key and the resulting decrypted vehicle identification code is checked against a list of authorized identification codes from long term memory 342. In another embodiment, a received vehicle identification code and the decryption key is used to seed a pseudo-random number generator to produce a pseudo-random number that is compared with a validation code transmitted received along with the vehicle identification code. For proper authorization, the pseudo-random number should match the validation code and the received vehicle identification code should match an entry in a list of authorized identification codes from long term memory 342.

The external data port 343 is used for coupling the phase selector 318 to a computer. In one embodiment, external data port 343 is an RS232 serial port. Typically, portable computers are used in the field for exchanging data with and configuring a phase selector. Logged data is removed from the phase selector 318 via the external data port 343 and keys 339 and a list of authorized identification codes is stored in the phase selector 318 via the external data port 343. The external data port 343 can also be accessed remotely using a wired or wireless modem, local-area network or other such device.

Keys 339 can be updated from a portable computer via external data port 343. In addition, main phase selector processor 340 can update keys 339 in response to a command received from detector assemblies 14 to update the keys that has been validated for proper authorization by a decoder circuit 338A or 338B.

The real time clock 344 provides the main phase selector processor 340 with the actual time. The real time clock 344 provides time stamps that can be logged to the long term memory 342 and is used for timing other events, including timed update of the validation algorithm and/or keys 339. In one embodiment, the validation algorithm and values for keys 339 are selected from a list stored in memory 342 at specified times, such as once a day. In another embodiment, the validation algorithm and values for keys 339 are generated from the date and time or another time-based parameter provided by the real time clock 344 or another natural parameter. For example, a hash algorithm of the date, time, and/or a current value for manually provided key is used to periodically generate values automatically for keys 339. In yet another embodiment, the validation algorithm and keys 339 are updated with new values at a particular time, such as three in the morning of the day after receiving the new values for validation algorithm and values for keys 339.

In an alternative embodiment, the validation algorithm uses multiple validation keys. For example, real time clock 344 can be incompletely synchronized with a similar real time clock in each of emitters 12 and validation using two validation keys may compensate for validation keys that are periodically updated using incompletely synchronized real-time clocks. During a first half or other initial portion of the period for a validation key based on real-time clock 344, decoder circuits 338A and 338B can perform validation using the validation key and the prior validation key. Validation is successful if either validation attempt succeeds. During a second half or other final portion of the period for a validation key based on real-time clock 344, decoder circuits 338A and 338B can similarly perform validation using the validation key and the next validation key.

In various embodiments, the data transmitted by emitters 12 and received by detectors 14 is provided by interleaving the presence or absence of an optical pulse between pulses of a chain of pulses transmitted at a particular frequency. For example, the presence of an interleaved optical pulse can represent a binary one and the absence of an interleaved optical pulse can represent a binary zero. The particular frequency can be employed in communication between optical emitter 12 and optical detector apparatus 14, such as a frequency of approximately 10 Hz for identifying an emergency vehicle and a frequency of approximately 14 Hz for identifying a mass transit vehicle.

In various other embodiments, the data transmitted by emitters 12 and received by detectors 14 is provided by transmitting a chain of pulses that either shifts or does not shift the nominal frequency of each pulse. For example, not shifting the nominal frequency of a pulse can correspond to one data value and shifting a specific pulse to a slightly higher or slight lower frequency relative to the nominal frequency can represent other data values. For example, not shifting the nominal frequency, shifting down the nominal frequency by one unit, shifting up the nominal frequency by one unit, and shifting up the nominal frequency by two units can correspond to data values for a pulse of zero, one, two, and three, respectively.

Figure 14:
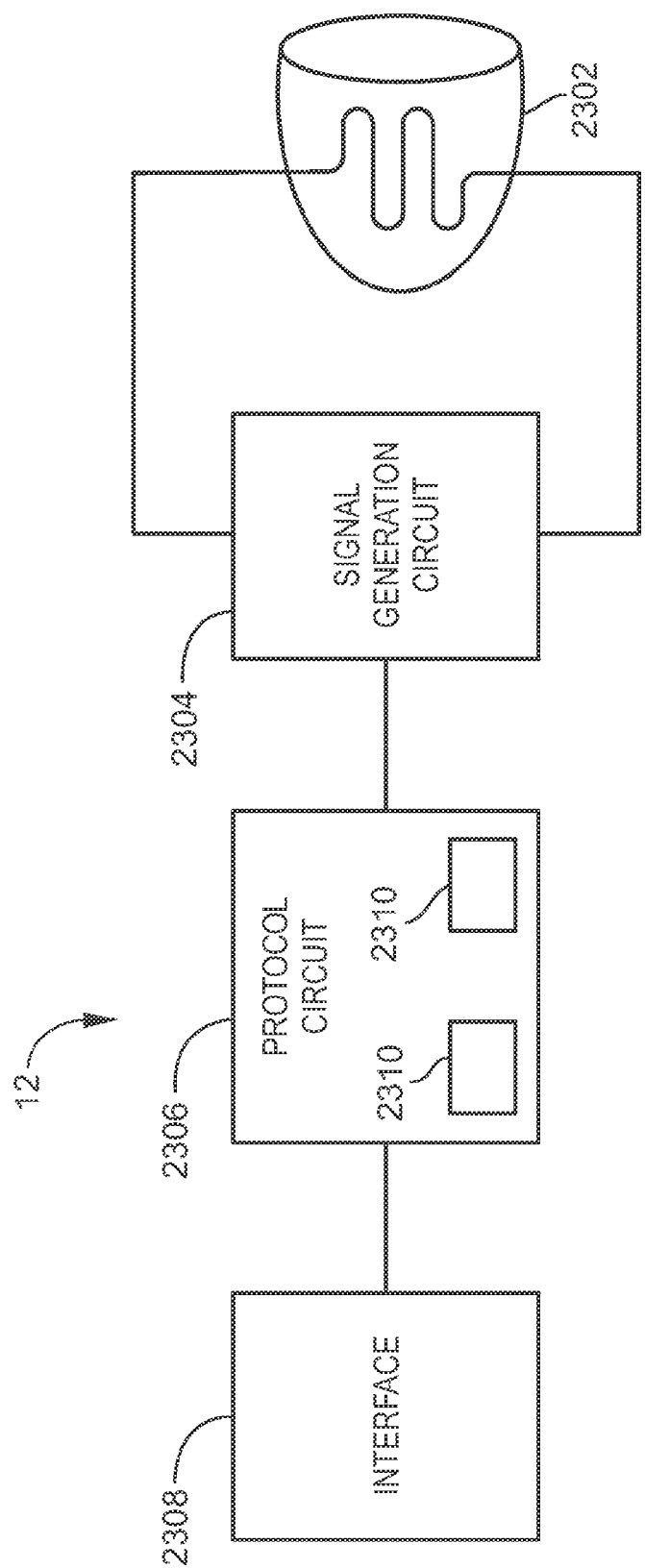
FIG. 14 is a block diagram of the components for an optical emitter on an emergency vehicle, where the optical emitter communicates with an optical detector apparatus on a civilian vehicle for communication between the emergency vehicle and civilian vehicle.

FIG. 14 is a block diagram of the components of the optical emitter 12 for communicating with the optical detector apparatus 14 in accordance with the present invention. An optical source 2302, such as a Xenon flash tube or high intensity light emitting diode, on emergency vehicle 18 emits short pulses of light that are received by optical detector apparatus 14 to issue warnings to the driver of the vehicle 20.

A signal generation circuit 2304 generates an output signal to control the flashes of light from optical source 2302. The signal generation circuit 2304 can include a transformer used to generate an output signal having high-voltage pulses that each trigger a Xenon strobe light to emit a pulse of light. Data specifying the timing of the pulses of the output signal can be provided by protocol circuit 2306, with the pulses of the output signal corresponding to one or more optical communication protocols, which each can have a corresponding microcontroller implementing a detection protocol. When the pulses of the output signal correspond to more than one optical communication protocol, the pulses can concurrently communicate all of the optical communication protocols.

Protocol circuit 2306 can generate the timing specification for the pulses of light emitted by optical source 2302. Protocol circuit 2306 can generate the timing specification of the pulses of light emitted by optical source 2302 by generating the data values to be embedded in the optical pulse stream and encoding these data values to generate the timing specification for the pulses. The data values embedded in the optical pulse stream can include information specified at user interface 2308.

In one embodiment, interface 2308 includes an input device used by an operator or administrator of the emergency vehicle 18 carrying emitter 12 to specify one or more communications from emergency vehicle 18 to the optical detector apparatus 14 of vehicle 20. Example input devices include thumbwheel switches and keyboards. An operator setting up such communications can additionally specify an operating mode for the optical emitter 12. For example, one digit of a multi-digit communication from emergency vehicle 18 to civilian vehicle 20 can specify that optical emitter 12 should emit an optical pulse stream compatible with a subset of all the optical communication protocols supported by the optical emitter 12. For ease of usage by an operator, the operator can be unaware that a portion of each such communications from emitter 12 to detector 14 actually selects an operating mode instead of or in addition to being embedded in the transmitted optical pulse stream. In another embodiment, interface 2308 includes a mechanism to specify default operation of the emitter 12 or to configure operation of the emitter 12 after manufacture, such as jumper settings within the enclosure of the emitter 12 or externally configurable non-volatile storage.

Protocol circuit 2306 can generate a specification of the optical pulse stream, including embedding a communication from emitter 12 to detector 14 received from user interface 2308. Protocol circuit 2306 can include storage circuits 2310 providing protocol information for various optical communication protocols. In one embodiment, each optical communication protocol has a corresponding storage circuit 2310. In another embodiment, a single storage circuit 2310 provides protocol information for all of the optical communication protocols.

In one embodiment, the information in a storage circuit 2310 can be a protocol algorithm, such as protocol state transition diagrams or processor-executable code. The protocol circuit 2306 can include a processor, such as a microprocessor, that executes the processor-executable code to create data, such as a specification of the optical pulse stream according to the communication protocols.

In another embodiment, the information in storage circuit 2310 can be a logic implementation, such as a programmable logic array or programmable logic device configured with programming data for the communication protocols. In yet another embodiment, the information in storage circuit 2310 can be protocol tables, such as the next state and outputs as a function of the current state and inputs. Combinations of a protocol algorithm, a logic implementation, and tables can be used by protocol circuit 2306 in alternative embodiments. The contents of storage circuit 2310 can be externally accessible to allow the manufacturer or an administrator of a fleet of emergency or first responder vehicles to update the communication protocols supported by protocol circuit 2306.

It should be noted that features found on the optical detector apparatus 14 shown in FIGS. 5 and 9B may be incorporated into the rear view mirror apparatus 152 shown in FIGS. 8A, 8B, 8C, 8D, and 9A. It should be noted that features found on the rear view mirror apparatus 152 shown in FIGS. 8A, 8B, 8C, 8D and 9A may be incorporated into the optical detector apparatus 14 shown in FIGS. 5 and 9B.

It should be noted that the present first responders' roadway priority system includes the concept of providing a unique code generated by the optical emitter 12 that lets the driver of vehicle 20 know that the driver is approaching a first responders' vehicle such as an ambulance. The optical detector apparatus 14 may identify and process this unique code with a microcontroller. This unique code is embedded in the optical signals generated by the optical emitter 12. Moreover, optical detectors on the apparatus 14 that are oriented in the frontward direction may be, exclusively, the only optical detectors on the apparatus 14 that are configured, through circuitry, software, or other means, that can process this unique code that is thrown against the flow of traffic. Other optical detectors on the apparatus 14, such as those oriented rearwardly or sidewardly, may be configured to ignore this unique code.

Other codes generated and emitted by the optical emitter 12 and picked up and processed by the optical detector apparatus 14 may communicate a national disaster, a tornado warning, a metro bus passing on the shoulder of the road, the upcoming weather conditions, ice warnings, and snow warnings. Further, transit vehicles such as busses, police cars, ambulances, fire trucks, and highway or utility vehicles and workers may generate their own unique messages and codes such that the driver of the civilian vehicle can be informed more specifically about who is ahead of him or her and who is behind him or her.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A method for notifying a first driver of a first vehicle that a first responder is ahead of the first driver on a road and that the first responder is stopped on the road, the method comprising the steps of:
   a) emitting a first optical signal against a flow of traffic and against a direction in which the first vehicle is traveling, the first optical signal being emitted from a first location on or adjacent to the road such that the first optical signal impinges upon the first vehicle prior to the first vehicle reaching said first location;
   b) then detecting the first optical signal with a first optical detector in or on the first vehicle;
   c) then determining whether the first optical signal is from a location forwardly of the first vehicle; and
   d) then providing a warning in the first vehicle to the first driver of the first vehicle if the first optical signal is from a location forwardly of the first vehicle, the warning being one of an audible warning and visible warning, and the warning informing the first driver of the first vehicle of a situation at said location, wherein the step of providing a warning comprises a request that the first driver move the first vehicle away from a shoulder of the road.

2. The method of claim 1, wherein the step of determining comprises the step of distinguishing whether said first optical signal has been emitted from a position forwardly of the first vehicle or from a position rearwardly of the first vehicle.

3. The method of claim 1, and further comprising the step of detecting a second optical signal with a second optical detector, the second optical detector being oriented generally opposite of the first optical detector such that the second optical detector is oriented to detect optical signals being emitted from a second location behind said first vehicle.

4. The method of claim 1, and further comprising the step of detecting a second optical signal with an optical detector apparatus, the optical detector apparatus being capable of picking up an optical signal originating from generally anywhere in a 360 degree horizontal range about the optical detector apparatus, such that the optical detector apparatus is capable of picking up said second optical signal where said second optical signal originates from one of a forward position of said first vehicle, a rearward position or said first vehicle, or a position disposed between said forward and rearward positions, the optical detector apparatus including the first optical detector.

5. The method of claim 1, wherein the step of providing a warning comprises information that there is a situation up ahead on or adjacent to the shoulder of the road.

6. The method of claim 1, wherein said step of emitting a first optical signal comprises the step of selecting a set of optical pulses to emit the first optical signal.

7. The method of claim 1, wherein said step of emitting a first optical signal comprises the step of emitting an infrared light signal.

8. The method of claim 1, wherein said step of emitting a first optical signal comprises the step of selecting a base for said first optical signal, with the base being selected being a second vehicle.

9. The method of claim 1, wherein said step of emitting a first optical signal comprises the step of selecting a base for said first optical signal, with the base being selected being a bank of lights on a second vehicle.

10. An apparatus in or on a first vehicle for detecting a first optical signal being emitted toward the first vehicle from a first location forwardly of the first vehicle and for detecting a second optical signal being emitted toward the first vehicle from a second location generally anywhere in a 360 degree horizontal range about the apparatus, the apparatus comprising:
   a) an optical detector apparatus oriented to pick up:
      i) the first optical signal being emitted toward the first vehicle from said first location forwardly of the first vehicle; and ii) the second optical signal being emitted toward the first vehicle from a second location generally anywhere in a 360 degree horizontal range about the optical detector apparatus;
b) a microcontroller in communication with the optical detector apparatus;
c) a warning device in communication with the microcontroller, the warning device being one of an audio warning device and visual warning device;
d) the warning device capable of issuing a first warning in response to a communication from the microcontroller that is associated with the first optical signal;
e) the warning device capable of issuing a second warning in response to a communication from the microcontroller that is associated with the second optical signal;
f) the first warning comprising a warning associated with a first situation at said first location forwardly of the first vehicle; and
g) the second warning comprising a warning associated with a second situation at said second location relative to the first vehicle.

11. The apparatus of claim 10, wherein the optical detector apparatus is one of a) housed in and b) engaged to a rearview mirror apparatus.

12. A method for notifying by first and second optical signals, where i) by the first optical signal a first driver driving a first vehicle is notified that a first responder is ahead of the first driver on a road and that the first responder is stopped on the road at a first location, and ii) by the second optical signal the first driver driving the first vehicle is notified that a second vehicle is at a second location generally anywhere in a 360 degree horizontal range about the first vehicle, the method comprising the steps of:
a) emitting the first optical signal against a flow of traffic and against a direction in which the first vehicle is traveling, the first optical signal being emitted from the first location on or adjacent to the road such that the first optical signal impinges upon the first vehicle prior to the first vehicle reaching said first location;
b) detecting the first optical signal with an optical detector apparatus in or on the first vehicle;
c) determining whether the first optical signal is from a location forwardly of the first vehicle;
d) providing a warning in the first vehicle to the first driver of the first vehicle if the first optical signal is from the first location forwardly of the first vehicle, the warning being one of an audible warning and visible warning, and the warning informing the first driver of the first vehicle of a situation at the first location;
e) detecting the second optical signal with the optical detector apparatus, the optical detector apparatus being capable of picking up an optical signal originating from generally anywhere in a 360 degree horizontal range about the optical detector apparatus, such that the optical detector apparatus is capable of picking up said second optical signal where said second optical signal originates from one of a forward position of said first vehicle, a rearward position of said first vehicle, or a position disposed between said forward and rearward positions.

13. The method of claim 12, wherein the step of determining comprises the step of distinguishing whether said first optical signal has been emitted from a position forwardly of the first vehicle or from a position rearwardly of the first vehicle.

14. The method of claim 12, wherein the step of providing a warning comprises a request that the first driver move the first vehicle over.

15. The method of claim 12, wherein the step of providing a warning comprises information that there is a situation up ahead on or adjacent to a shoulder of the road.

16. The method of claim 12, wherein said step of emitting a first optical signal comprises the step of selecting a set of optical pulses to emit the first optical signal.

17. The method of claim 12, wherein said step of emitting a first optical signal comprises the step of emitting an infrared light signal.

18. The method of claim 12, wherein said step of emitting a first optical signal comprises the step of selecting a base for said first optical signal, with the base being selected being a second vehicle.

19. The method of claim 12, wherein said step of emitting a first optical signal comprises the step of selecting a base for said first optical signal, with the base being selected being a bank of lights on a second vehicle.

* * * * *